(12) United States Patent
Takenaka

(10) Patent No.: US 12,551,914 B2
(45) Date of Patent: Feb. 17, 2026

(54) INJECTION DEVICE

(71) Applicant: TOYOTA JIDOSHA KABUSHIKI KAISHA, Toyota (JP)

(72) Inventor: Tetsuhiro Takenaka, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 560 days.

(21) Appl. No.: 18/060,832

(22) Filed: Dec. 1, 2022

(65) Prior Publication Data

US 2023/0241639 A1 Aug. 3, 2023

(30) Foreign Application Priority Data

Jan. 31, 2022 (JP) .................................. 2022-013026

(51) Int. Cl.
  *B05B 13/06* (2006.01)
  *B05B 7/08* (2006.01)
  *B08B 9/032* (2006.01)

(52) U.S. Cl.
  CPC ........ *B05B 13/0627* (2013.01); *B05B 7/0876* (2013.01); *B08B 9/032* (2013.01); *B08B 2209/032* (2013.01)

(58) Field of Classification Search
  USPC ............ 118/306, 317, 712, 713; 427/236, 8
  See application file for complete search history.

(56) References Cited

U.S. PATENT DOCUMENTS

| | | | | |
|---|---|---|---|---|
| 4,335,677 | A | * | 6/1982 | Nagata ................ B05B 13/0627 118/DIG. 10 |
| 5,309,947 | A | * | 5/1994 | Hinger ...................... E03F 3/06 425/97 |
| 5,536,531 | A | | 7/1996 | Owen et al. |
| 7,591,901 | B1 | * | 9/2009 | Weisenberg ........ F16L 55/1645 118/317 |
| 2012/0067285 | A1 | * | 3/2012 | Kodama ................ B05B 7/0075 118/723 HC |
| 2017/0314622 | A1 | | 11/2017 | Akanuma et al. |
| 2020/0072282 | A1 | | 3/2020 | Takenaka |

FOREIGN PATENT DOCUMENTS

| | | |
|---|---|---|
| AT | 149907 B | 6/1937 |
| CN | 110873131 A | 3/2020 |
| DE | 102007008227 A1 | 8/2008 |
| DE | 102019208580 A1 | 3/2020 |

(Continued)

*Primary Examiner* — Yewebdar T Tadesse
(74) *Attorney, Agent, or Firm* — Hunton Andrews Kurth LLP

(57) ABSTRACT

An injection device includes an insertion portion configured to be inserted into a corresponding portion in a narrow space in a state of being grasped by an operator. The insertion portion includes an injection portion which is a double pipe line including an inner pipe line and an outer pipe line defining an annular pipe line between the inner pipe line and the outer pipe line. The inner pipe line is a pipe line provided, at a tip end portion, with a first fluid substance injection port configured to inject a first fluid substance supplied into the inner pipe line. The annular pipe line is a pipe line provided, at a tip end portion, with a second fluid substance injection port configured to inject a second fluid substance supplied into the annular pipe line.

13 Claims, 28 Drawing Sheets

(56) References Cited

FOREIGN PATENT DOCUMENTS

| | | |
|---|---|---|
| DK | 1961487 T3 | 4/2009 |
| EP | 3730743 A1 | 10/2020 |
| JP | S59055364 A | 3/1984 |
| JP | H10503123 A | 3/1998 |
| JP | H11207216 A | 8/1999 |
| JP | 2006263591 A | 10/2006 |
| JP | 2008200602 A | 9/2008 |
| JP | 2015184396 A | 10/2015 |
| JP | 2020037949 A | 3/2020 |
| KR | 20210145451 A | 12/2021 |
| WO | 9603220 A1 | 2/1996 |
| WO | 9747917 A1 | 12/1997 |

\* cited by examiner

INJECTION DEVICE

CROSS-REFERENCE TO RELATED APPLICATION

This application claims priority to Japanese Patent Application No. 2022-013026 filed on Jan. 31, 2022, incorporated herein by reference in its entirety.

BACKGROUND

1. Technical Field

The present disclosure relates to an injection device.

2. Description of Related Art

A device has been proposed in which an insertion portion (greasing pipe, or the like) inserted into a guide through hole of a guide jig fixed to a clutch housing is configured to be inserted into a corresponding portion (a portion where grease needs to be supplied from a tip end portion of the greasing pipe) in a narrow space (see, for example, Japanese Unexamined Patent Application Publication No. 2020-37949 (JP 2020-37949 A)).

SUMMARY

However, in JP 2020-37949 A, when foreign matter (mud, dust, powder, or the like) adheres to the corresponding portion in the narrow space, the foreign matter cannot be removed, and thus, there is a problem in that grease is supplied with the foreign matter mixed therein.

The present disclosure provides an injection device capable of removing foreign matter adhering to a corresponding portion in a narrow space.

An injection device according to a first aspect of the disclosure includes an insertion portion configured to be inserted into a corresponding portion in a narrow space in a state of being grasped by an operator. The insertion portion includes an injection portion which is a double pipe line including an inner pipe line and an outer pipe line defining an annular pipe line between the inner pipe line and the outer pipe line. The inner pipe line is a pipe line provided, at a tip end portion, with a first fluid substance injection port configured to inject a first fluid substance supplied into the inner pipe line. The annular pipe line is a pipe line provided, at a tip end portion, with a second fluid substance injection port configured to inject a second fluid substance supplied into the annular pipe line.

With such a configuration, by spraying the second fluid substance injected from the second fluid substance injection port toward the corresponding portion, foreign matter adhering to the corresponding portion in the narrow space can be removed.

In the first aspect, a tip end of the inner pipe line may protrude farther than a tip end of the outer pipe line.

In the first aspect, the insertion portion may further include an imaging unit configured to capture an image including the tip end portion of the inner pipe line, the tip end portion of the annular pipe line, and a surrounding environments of the tip end portion of the inner pipe line and the tip end portion of the annular pipe line.

An injection device according to a second aspect of the disclosure includes an insertion portion configured to be inserted into a corresponding portion in a narrow space in a state of being grasped by an operator. The insertion portion includes an injection portion including a first pipe line and a second pipe line arranged in parallel with each other. The first pipe line is a pipe line provided, at a tip end portion, with a first fluid substance injection port configured to inject a first fluid substance supplied into the first pipe line. The second pipe line is a pipe line provided, at a tip end portion, with a second fluid substance injection port configured to inject a second fluid substance supplied into the second pipe line.

In the first aspect and the second aspect, the first fluid substance may be a fluid substance supplied to the corresponding portion, and the second fluid substance may be a foreign matter removing fluid substance that removes foreign matter adhering to the corresponding portion.

In the first aspect and the second aspect, the fluid substance may be an application fluid substance that is applied to the corresponding portion, and the foreign matter removing fluid substance may be air.

With each aspect of the present disclosure, it is possible to provide an injection device capable of removing foreign matter adhering to a corresponding portion in a narrow space.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a greasing device of a clutch release mechanism will be specifically described as a first embodiment (reference example) of the present disclosure with reference to the drawings. The applicable embodiment is not limited to embodiments described below.

First Embodiment

A greasing device of a first embodiment is used to perform low-cost and short-time inspection and grease injection maintenance for sliding defects (for example, sliding failure with increased friction, abnormal noise) caused by grease outflow from a fork grease lubrication portion in an MT clutch housing, and foreign matter contamination after a manual transmission vehicle has been flooded or crossed a river.

Figure 1:
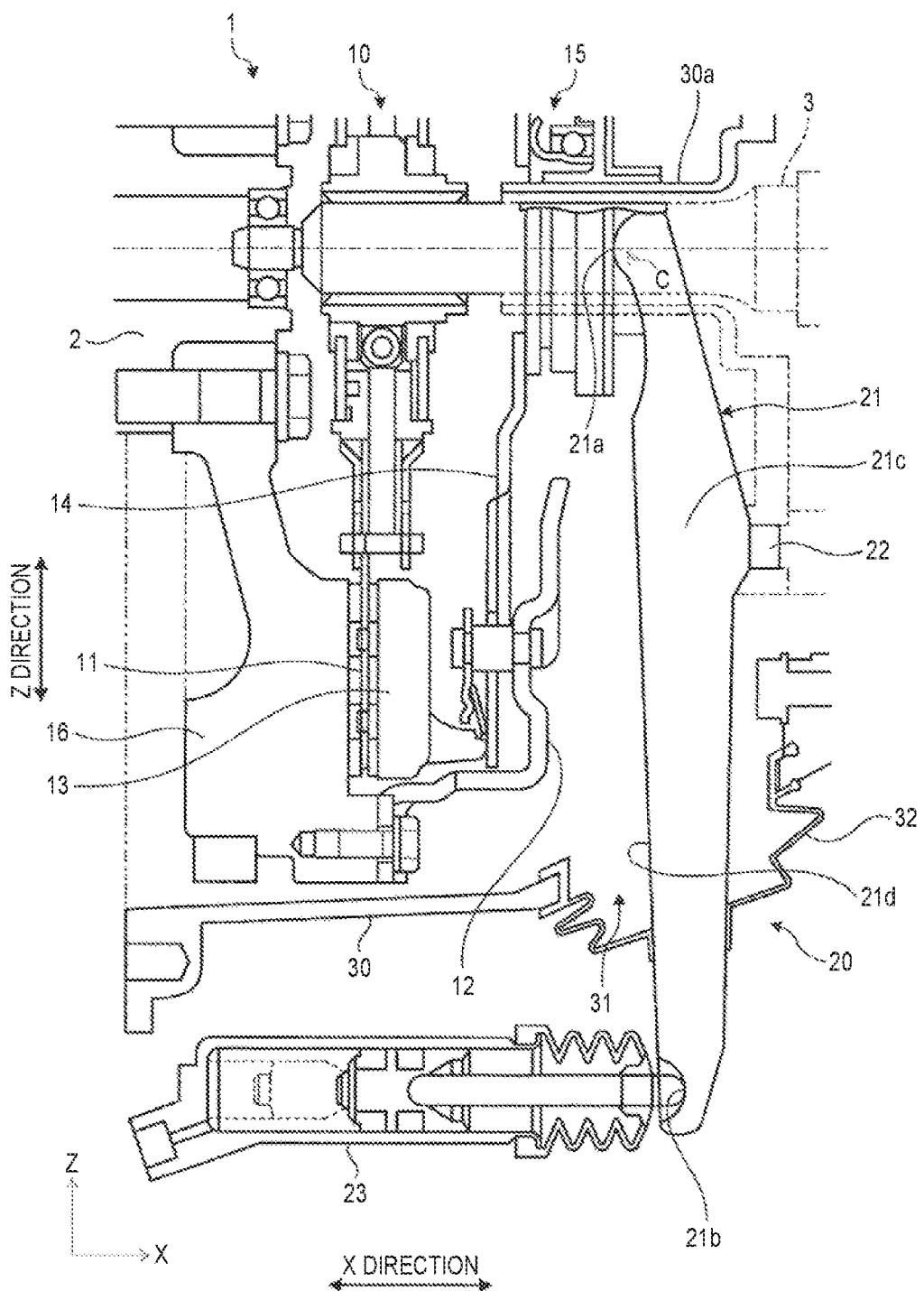
FIG. 1 is a view schematically illustrating a clutch release mechanism of a first embodiment.

FIG. 1 is a view schematically illustrating a clutch release mechanism of the first embodiment. As illustrated in FIG. 1, a clutch device 1 includes a clutch main body 10 that performs a power connection/disconnection operation, a clutch release mechanism 20 for operating the clutch main body 10, and a clutch housing 30 that accommodates the clutch main body 10 therein. For example, the clutch device 1 is mounted on a manual transmission vehicle and is arranged between an engine and a transmission.

An X direction illustrated in FIG. 1 represents an axial direction along a central axis, and a Z direction represents a direction (the direction may be called a radial direction or a height direction) orthogonal to the central axis. When the Z direction is the height direction, an upper side may be described as a tip end side and a lower side may be described as a base end side. Further, a Y direction, which will be described below, represents a direction orthogonal to the X direction and the Z direction. The Y direction may be described as a width direction.

The clutch body 10 includes a clutch disc 11, a clutch cover 12, a pressure plate 13, a diaphragm spring 14, and a release bearing 15.

The clutch disc 11 has a friction surface (clutch facing) interposed between the pressure plate 13 and a flywheel 16, and is spline-fitted to an input shaft 3 of the transmission. The rotation of the flywheel 16 is transmitted to the input shaft 3 by the frictional force between the friction surface of the clutch disc 11 and the flywheel 16. The flywheel 16 is bolted to a crankshaft 2 of the engine, and the flywheel 16 and the crankshaft 2 rotate integrally.

The clutch cover 12 is provided so as to cover an outer peripheral side of the clutch disc 11, and rotates integrally with the pressure plate 13 and the diaphragm spring 14. The pressure plate 13 is provided between the friction surface of the clutch disc 11 and the diaphragm spring 14. The diaphragm spring 14 is a member for pressing the friction surface of the clutch disc 11 toward the flywheel 16 via the pressure plate 13, and is provided on an opposite side of the friction surface of the clutch disc 11 with respect to the pressure plate 13. A peripheral edge portion of the diaphragm spring 14 is connected to the pressure plate 13, and a central portion of the diaphragm spring 14 is connected to the release bearing 15. This allows the diaphragm spring 14 to press the pressure plate 13.

When the clutch main body 10 is engaged, the pressure plate 13 presses the friction surface of the clutch disc 11 toward the flywheel 16 side by the elastic force of the diaphragm spring 14. As a result, it is switched to a connected state where a frictional force is generated between the friction surface of the clutch disc 11 and the flywheel 16, and the rotation of the flywheel 16 is transmitted to the clutch disc 11.

When the clutch main body 10 is released, the release bearing 15 pushes the central portion of the diaphragm spring 14, such that the peripheral edge portion of the diaphragm spring 14 is displaced in a direction away from the flywheel 16. In this case, the pressure plate 13 is pulled in a direction away from the flywheel 16 together with the diaphragm spring 14. As a result, it is switched to a disconnected state where the frictional force between the friction surface of the clutch disc 11 and the flywheel 16 is eliminated, and the rotation of the flywheel 16 is not transmitted to the clutch disc 11.

The clutch release mechanism 20 includes a clutch release fork 21, a release fork support 22, and a release cylinder 23.

The clutch release fork 21 is a member for moving the release bearing 15 in an axial direction, and is configured to be swingable while being supported by the release fork support 22. The clutch release fork 21 is an elongated member made of metal, and has a structure in which a tip end side is bifurcated.

As illustrated in FIG. 1, a first end side of the clutch release fork 21 is composed of a pressing portion 21a that presses the release bearing 15 in the axial direction. The pressing portion 21a is configured to have a bifurcated structure in which the tip end side is bifurcated so as to pinch the input shaft 3 inside the clutch housing 30. A portion (abutment portion) of the pressing portion 21a facing the release bearing 15 in the axial direction comes into contact with the release bearing 15. A second end side of the clutch release fork 21 is composed of a connection portion 21b that protrudes to the outside of the clutch housing 30 through a through hole 31 of the clutch housing 30 and is connected to the release cylinder 23. Further, the second end side of the clutch release fork 21 is covered with a fork boot 32 at a position extending to the outside of the clutch housing 30. The fork boot 32 is attached to the through hole 31. The fork boot 32 may be provided with a hole (cooling hole) for releasing, to the outside of the clutch housing 30, the frictional heat generated when the clutch main body 10 is in a semi-engaged state.

Further, the clutch release fork 21 has a fulcrum portion 21c supported by the release fork support 22 between the pressing portion 21a and the connection portion 21b. The release fork support 22 is composed of a main body portion fixed to a partition wall of the clutch housing 30 and a pivot portion (not illustrated) having a spherical surface on a tip end side of the main body portion. The partition wall of the clutch housing 30 is composed of a retainer to which a bearing (not illustrated) for supporting the input shaft 3 is attached. The retainer is a member fixed to the clutch housing 30. A base side of the release fork support 22 is bolted to the retainer. Further, inside the clutch housing 30, a boss portion 30a of the retainer extends along the input shaft 3. The input shaft 3 is inserted inside the boss portion 30a.

The release bearing 15 is configured to be movable in the axial direction with respect to the boss portion 30a in a state of being supported on an outer periphery of the boss portion 30a via a sleeve. The release bearing 15 is arranged so as to contact the central portion of the diaphragm spring 14. The release bearing 15 has an outer ring supported by a sleeve on the boss portion 30a, and an inner ring in contact with the central portion of the diaphragm spring 14. In the release bearing 15, an inner ring in contact with the diaphragm spring 14 rotates, and an outer ring in contact with the clutch release fork 21 does not rotate.

Then, when a driver depresses a clutch pedal (not illustrated), the release cylinder 23 operates. When the connection portion 21b is operated by the release cylinder 23, the clutch release fork 21 swings with the fulcrum portion 21c as a fulcrum. Due to this swing, the pressing portion 21a presses the release bearing 15, and the release bearing 15 moves in the axial direction, and then the central portion of the diaphragm spring 14 is pushed toward the flywheel 16 side. As a result, the clutch main body 10 is switched to an open state. When the clutch main body 10 is in the open state, the flywheel 16 and the clutch disc 11 are disconnected such that power cannot be transmitted. When the operating force from the release cylinder 23 is released, the pressing force acting on the release bearing 15 from the pressing portion 21a disappears. As a result, the clutch main body 10 is switched to an engaged state. When the clutch main body 10 is switched to the engaged state, the flywheel 16 and the clutch disc 11 are connected so as to be able to transmit power. In this way, the swing of the clutch release fork 21 connects and disconnects a power transmission path between the crankshaft 2 on the engine side and the input shaft 3 on the transmission side.

Next, a greasing device 100 of the first embodiment will be described. The greasing device 100 is a device that supplies grease to the contact portion between the pressing portion 21a of the clutch release fork 21 and the release bearing 15. The greasing device 100 is configured such that a second jig 120 (insertion portion 121) is inserted into guide through holes (first hole 113, second hole 114) of a first jig 110 fixed to the clutch housing 30 as described below, and a second jig 120 (insertion portion 121) is inserted into a corresponding portion C until a tip end portion 131 of a greasing pipe 130 provided on the second jig 120 and the corresponding portion C have a predetermined positional relationship. As illustrated in FIG. 1, the corresponding portion C refers to a contact portion between the clutch release fork 21 (pressing portion 21a) and the release bearing 15, which is a greasing required portion (portion where grease needs to be supplied from the tip end portion 131 of the greasing pipe 130). As illustrated in FIG. 1, the corresponding portion C is arranged in an internal space surrounded by the clutch housing 30 (an example of a cover member of the present disclosure). The clutch housing 30 is formed with a through hole (through hole 31) for fixing a jig that communicates with the internal space.

When a vehicle equipped with the clutch device 1 is used in an environment where sand, muddy water, and the like are present, foreign matter may enter the clutch housing 30 from the cooling hole of the fork boot 32 described above, the cooling hole provided in the clutch housing 30, or an opening portion (none of which are shown) for draining water. Therefore, it is desirable to maintain the clutch release mechanism 20 and perform greasing maintenance to additionally supply grease to the contact portion between the clutch release fork 21 and the release bearing 15. Therefore, the greasing device 100 is configured such that the operation of greasing maintenance can be performed without requiring attachment or detachment of the clutch housing 30 (or a manual transmission unit including the clutch housing 30) to or from the vehicle. This greasing device 100 supplies grease from the outside of the clutch housing 30 through the through hole 31 of the clutch housing 30 to the contact portion between the clutch release fork 21 and the release bearing 15, which is the greasing required portion, by using the greasing pipe 130 (illustrated in FIG. 2 and the like).

Figure 2:
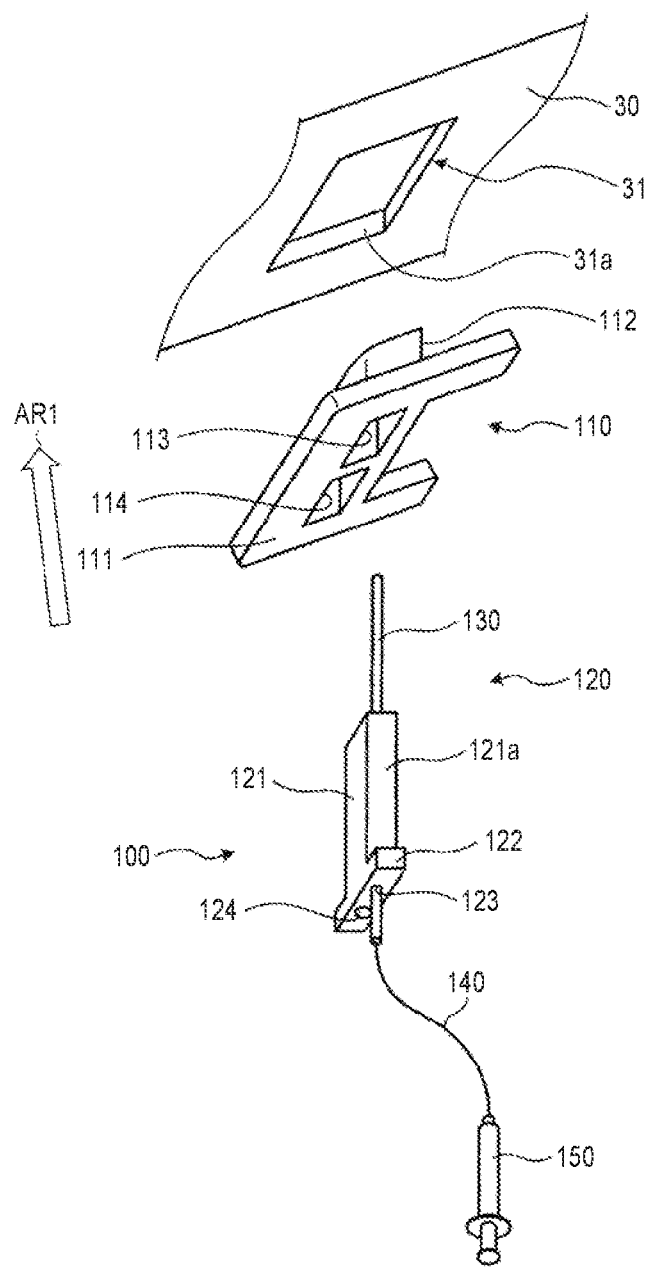
FIG. 2 is a view schematically illustrating a greasing device according to the first embodiment.

As illustrated in FIG. 2, the greasing device 100 includes the first jig 110, the second jig 120, the greasing pipe 130, a flexible pipe 140, and a greasing vessel 150. The first jig 110 and the second jig 120 are members for positioning the greasing pipe 130. The first jig 110 is a member attached to the through hole 31 of the clutch housing 30. The second jig 120 is a member inserted into the insertion hole of the first jig 110.

The first jig 110 is a guide jig that regulates a direction (insertion direction) of the greasing pipe 130 (grease injection pipe), and includes a base portion 111, a protrusion portion 112, and the first hole 113 and second hole 114 as positioning holes. This first jig 110 is an integrally molded product made of metal. The base portion 111 is formed in a flat plate shape and has a shape capable of partially covering the opening portion of the through hole 31. The width (the length in the Y direction described below) of the base portion 111 is larger than the opening width of the through hole 31. The protrusion portion 112 is a portion protruding from the base portion 111 and is a portion inserted into the through hole 31. The protrusion portion 112 functions as a positioning portion for positioning the first jig 110 by abutting on an inner surface 31a of the through hole 31 and abutting on a plane 21d of the clutch release fork 21.

The first hole 113 and the second hole 114 are insertion holes into which the greasing pipe 130 and the insertion portion 121 of the second jig 120 are inserted, and are positioning holes for positioning the greasing pipe 130. The first hole 113 and the second hole 114 are formed side by side in a width direction of the first jig 110, and both are through holes penetrating from the base portion 111 on a base end side toward the protrusion portion 112 on a tip end side. In this description, the term "insertion hole" is used when the first hole 113 and the second hole 114 are not particularly distinguished.

The second jig 120 has the insertion portion 121 having a quadrangular cylindrical shape inserted into the first hole 113 and the second hole 114 of the first jig 110, and a stopper portion 122 that abuts on a surface 111a of the first jig 110. This second jig 120 is an integrally molded product made of metal. Further, the greasing pipe 130 is integrated with the second jig 120. The second jig 120 has two through holes 123, 124 extending linearly along the insertion portion 121 from the base end side to the tip end side. One through hole 123 is a hole for a greasing pipe. The other through hole 124 is a hole for an endoscope. A greasing pipe 130 is fixed in the through hole 123 in a state of being inserted. An endoscope 160 is fixed in the through hole 124 in a state of being inserted (see FIG. 3). Further, the stopper portion 122 has a stopper surface 122a (illustrated in FIG. 3) that abuts on the surface 111a of the first jig 110.

The greasing pipe 130 is a pipe for supplying grease to the contact portion between the pressing portion 21a of the clutch release fork 21 and the release bearing 15 inside the clutch housing 30. The greasing pipe 130 is a long injection portion including the tip end portion 131 from which grease (an example of the fluid substance of the present disclosure) is injected. This greasing pipe 130 is made of metal. The tip end portion 131 of the greasing pipe 130 is provided with an opening portion 131a (hereinafter, also referred to as an injection port 131a) for injecting grease. The flexible pipe 140 is connected to the base end side of the greasing pipe 130. The greasing pipe 130 is connected to the greasing vessel 150 via the flexible pipe 140.

Figure 3:
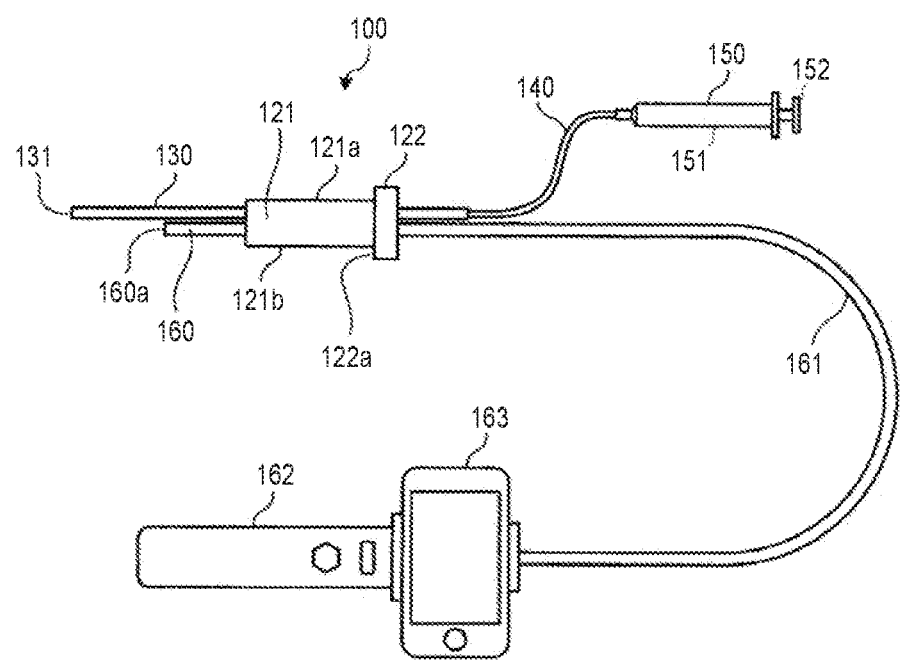
FIG. 3 is a schematic view for explaining the greasing device.

As illustrated in FIG. 3, the greasing device 100 includes an endoscope 160 as an imaging means. The endoscope 160 is a long imaging device including an imaging unit for capturing an image including the tip end portion of the greasing pipe 130 and its surrounding environments (for example, corresponding portion C) in a tip end portion 160a. The endoscope 160 is an example of an imaging device of the present disclosure. The endoscope 160 is integrated with the second jig 120 and protrudes from the tip end side of the insertion portion 121. The tip end side of the endoscope 160 is a portion inserted into the clutch housing 30, and a lens is provided at a tip end portion 160a. The base end side of the endoscope 160 is connected to an operation portion 162 via a cable 161. By operating the operation portion 162, the internal structure of the clutch housing 30 can be photographed by the endoscope 160. An image (for example, an image including the tip end portion of the greasing pipe 130 and its surrounding environments (for example, the corresponding portion C)) taken by the endoscope 160 can be displayed on a display portion 163 attached to the operation portion 162.

The greasing vessel 150 is composed of a cylinder 151 and a push rod 152 (piston) (see FIG. 3). A flexible pipe 140 is connected to the cylinder 151 of the greasing vessel 150. By pushing the push rod 152 with the grease filled in the cylinder 151, the grease can be supplied from the greasing vessel 150 to the greasing pipe 130. It is also possible to perform greasing smoothly by, for example, inserting the greasing pipe 130 from the through hole 31 into the clutch housing 30 with grease filled in the greasing pipe 130 and the flexible pipe 140 in advance and operating the greasing vessel 150.

Figure 4A:
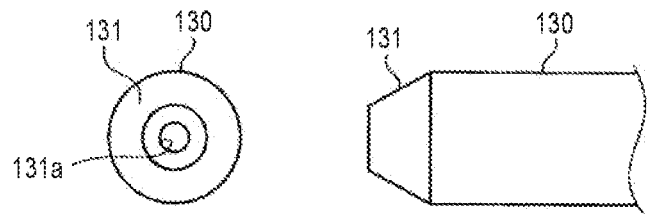
FIG. 4A is a view illustrating an example of an opening portion of a greasing pipe.
Figure 4B:
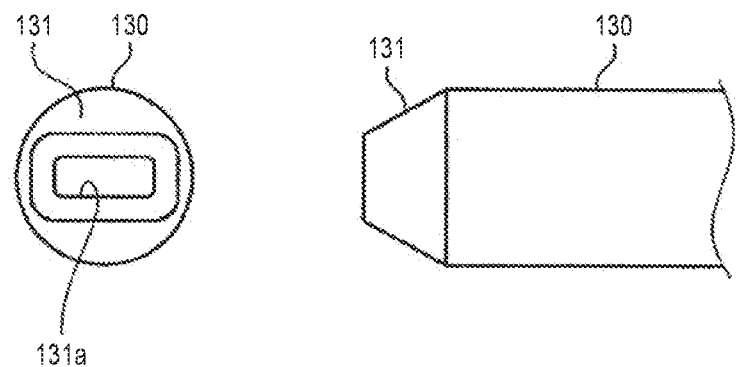
FIG. 4B is a view illustrating another example of the opening portion of the greasing pipe.

The tip end portion 131 of the greasing pipe 130 has a reduced diameter shape and includes the opening portion 131a for injecting grease. For example, the opening portion 131a of the greasing pipe 130 may be the opening portion 131a having a circular shape, as illustrated in FIG. 4A. Alternatively, as illustrated in FIG. 4B, the opening portion 131a may be the opening portion 131a having a flat shape. Since the tip end portion 131 of the greasing pipe 130 has a reduced diameter shape, it is possible to perform greasing on the greasing required portion through a narrow space in the clutch housing 30.

Figure 5:
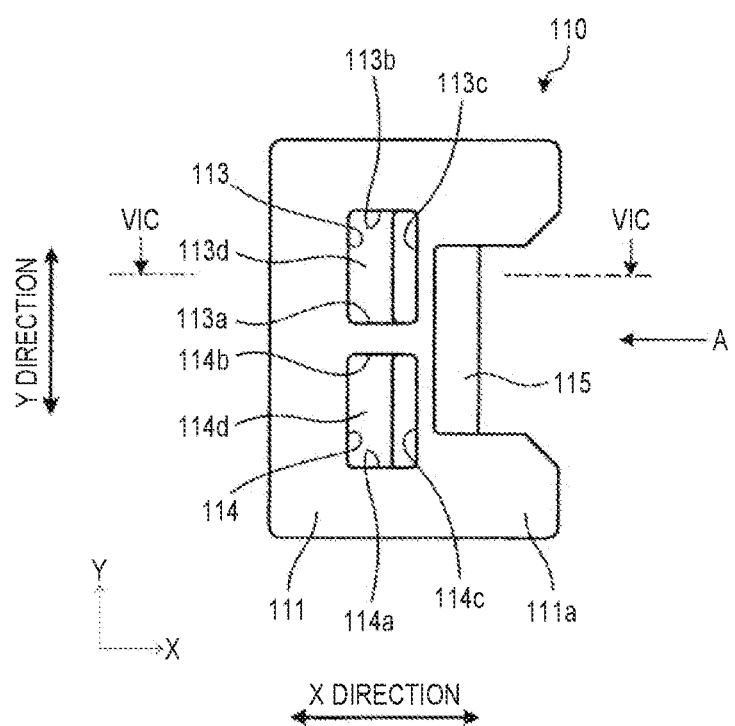
FIG. 5 is a plan view of a base end side of a first jig.
Figure 6A:
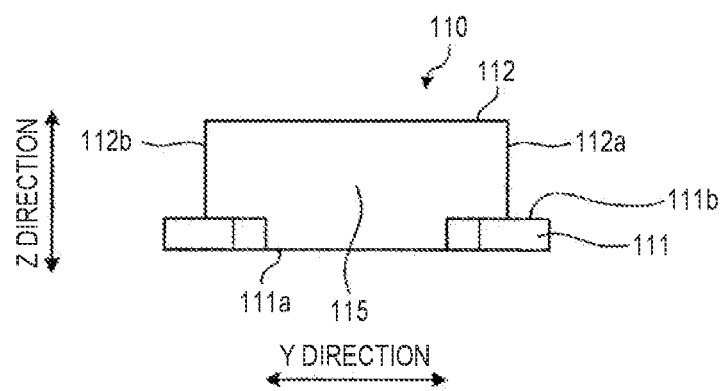
FIG. 6A is a view seen from a direction of the arrow A in FIG. 5.
Figure 6B:
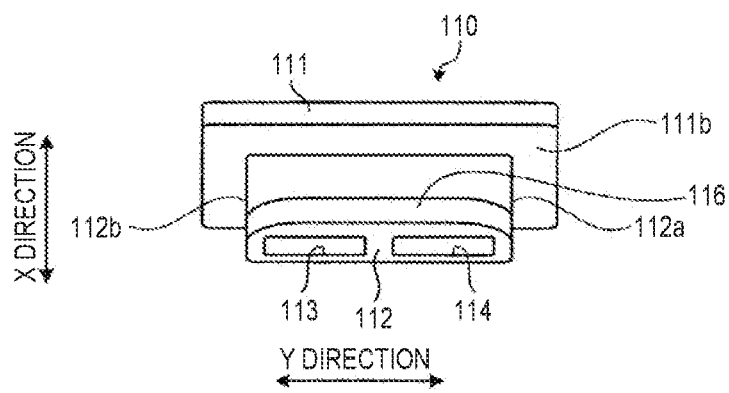
FIG. 6B is a perspective view of the first jig as viewed from a back side.
Figure 6C:
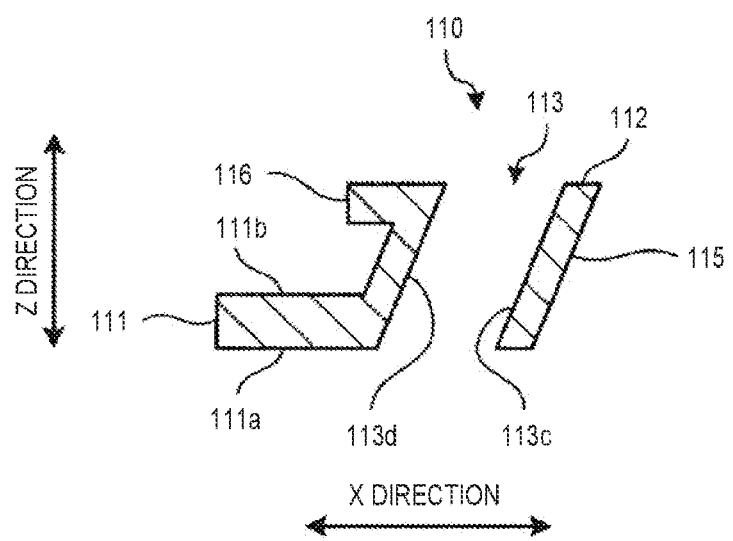
FIG. 6C is a view illustrating a cross section taken along the line VIC-VIC of FIG. 5.

Here, the first jig 110 will be described in detail with reference to FIGS. 5 and 6A to 6C. FIG. 5 is a plan view of the base end side of the first jig 110. FIG. 6A is a view seen from a direction of the arrow A in FIG. 5. FIG. 6B is a perspective view of the first jig 110 as viewed from the back side. FIG. 6C is a view illustrating a cross section taken along the line VIC-VIC of FIG. 5.

As illustrated in FIG. 5, the first jig 110 has rectangular opening portions of the first hole 113 and the second hole 114 on the surface 111a side of the base portion 111. The inner surface of the first hole 113 is a surface that functions as a guide surface for positioning the greasing pipe 130 by causing the insertion portion 121 to abut thereon. The inner surface of the first hole 113 has a first surface 113a, a second surface 113b, a third surface 113c, and a fourth surface 113d. The first surface 113a and the second surface 113b are surfaces facing each other in the Y direction, and are respectively short sides of the rectangular shape. The third surface 113c and the fourth surface 113d are surfaces facing each other in the X direction, and are respectively long sides of the rectangular shape. The inner surface of the second hole 114 is a surface that functions as a guide surface for positioning the greasing pipe 130, and has a first surface 114a, a second surface 114b, a third surface 114c, and a fourth surface 114d. The first surface 114a and the second surface 114b are surfaces facing each other in the Y direction, and are respectively short sides of the rectangular shape. The third surface 114c and the fourth surface 114d are surfaces facing each other in the X direction, and are respectively long sides of the rectangular shape.

Further, the first jig 110 has an abutment surface 115 that abuts on the plane 21d of the clutch release fork 21. The abutment surface 115 is a positioning surface, and the position of the first jig 110 in the X direction can be determined by causing the abutment surface 115 to abut on the plane 21d of the clutch release fork 21. As illustrated in FIG. 6A, the abutment surface 115 has a predetermined width in the width direction (Y direction) of the base portion 111 and extends along the height direction (Z direction) of the protrusion portion 112.

As illustrated in FIG. 6B, a key portion 116 is provided on a back surface 111b side of the first jig 110. The key portion 116 is a portion that is caught by the clutch housing 30 when the protrusion portion 112 is inserted into the through hole 31. This key portion 116 functions as a portion for holding the first jig 110 in the through hole 31. Further, opening portions of the first hole 113 and the second hole 114 that open in the protrusion portion 112 are also rectangular as in the base end side. As illustrated in FIG. 6C, the first hole 113 extends linearly inside the protrusion portion 112.

Figure 7:
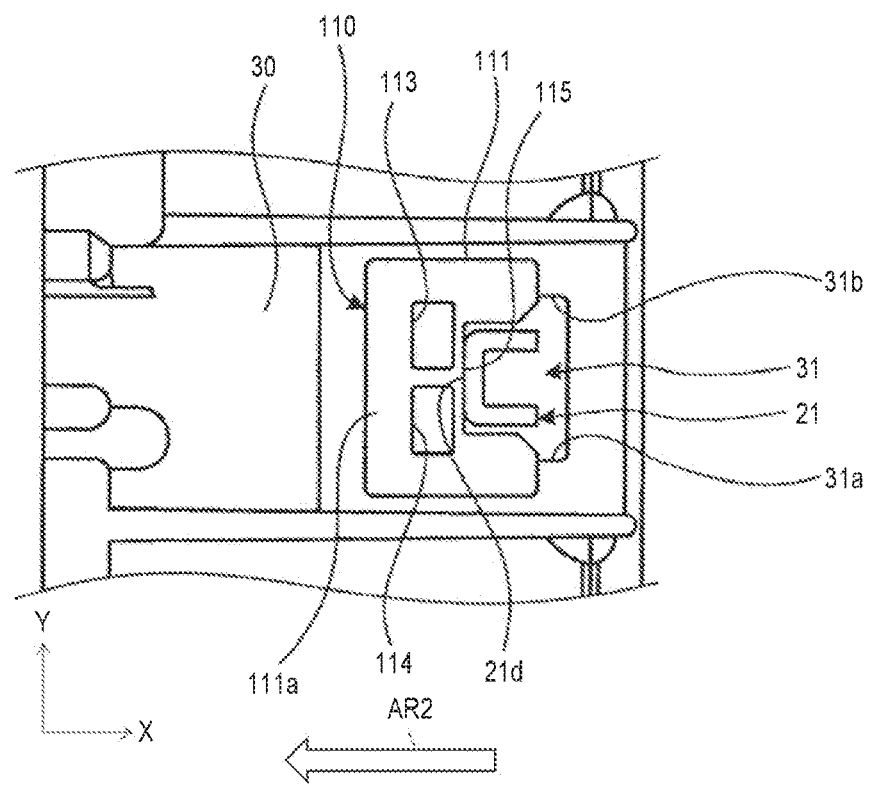
FIG. 7 is a view illustrating a state in which the first jig is attached to a through hole of a clutch housing.
Figure 8:
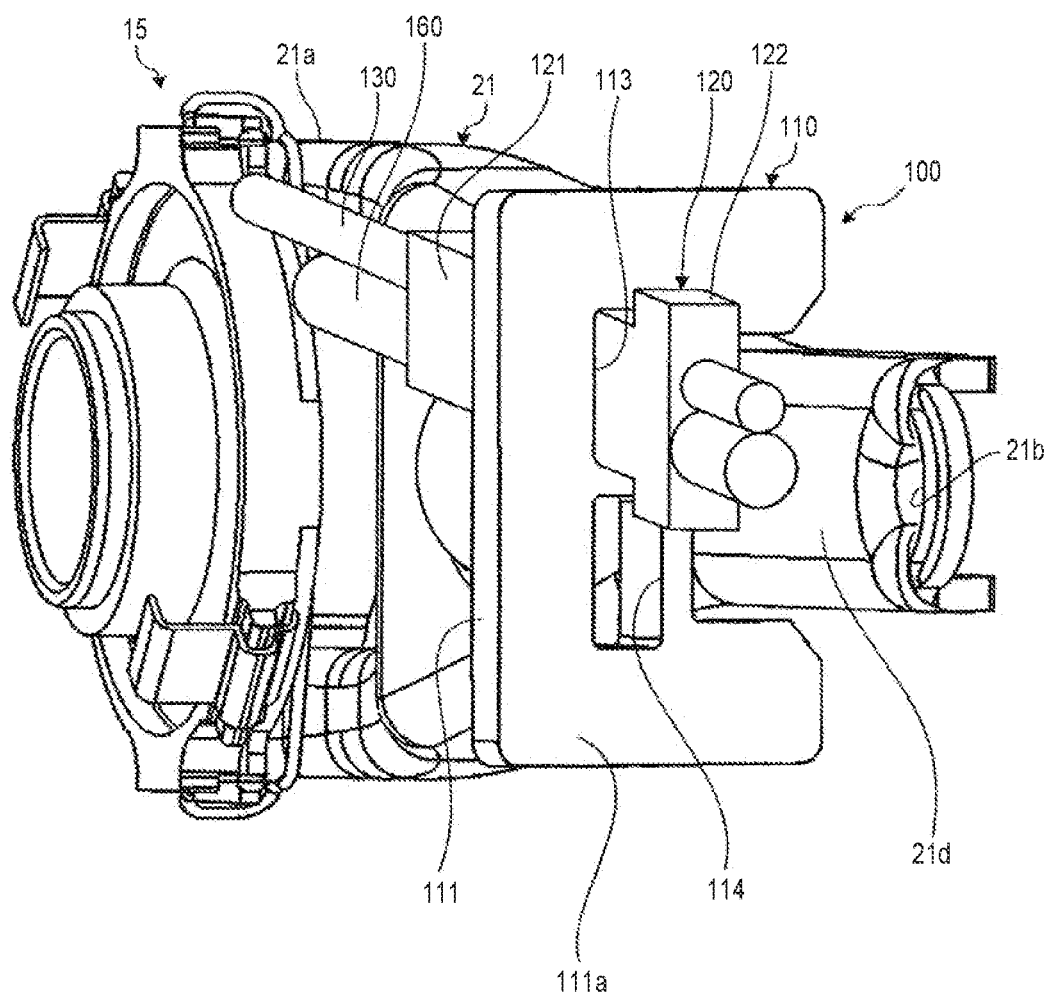
FIG. 8 is a view illustrating a state in which the greasing pipe extends toward a pressing portion of a clutch release fork with a second jig inserted in an insertion hole of the first jig.
Figure 9:
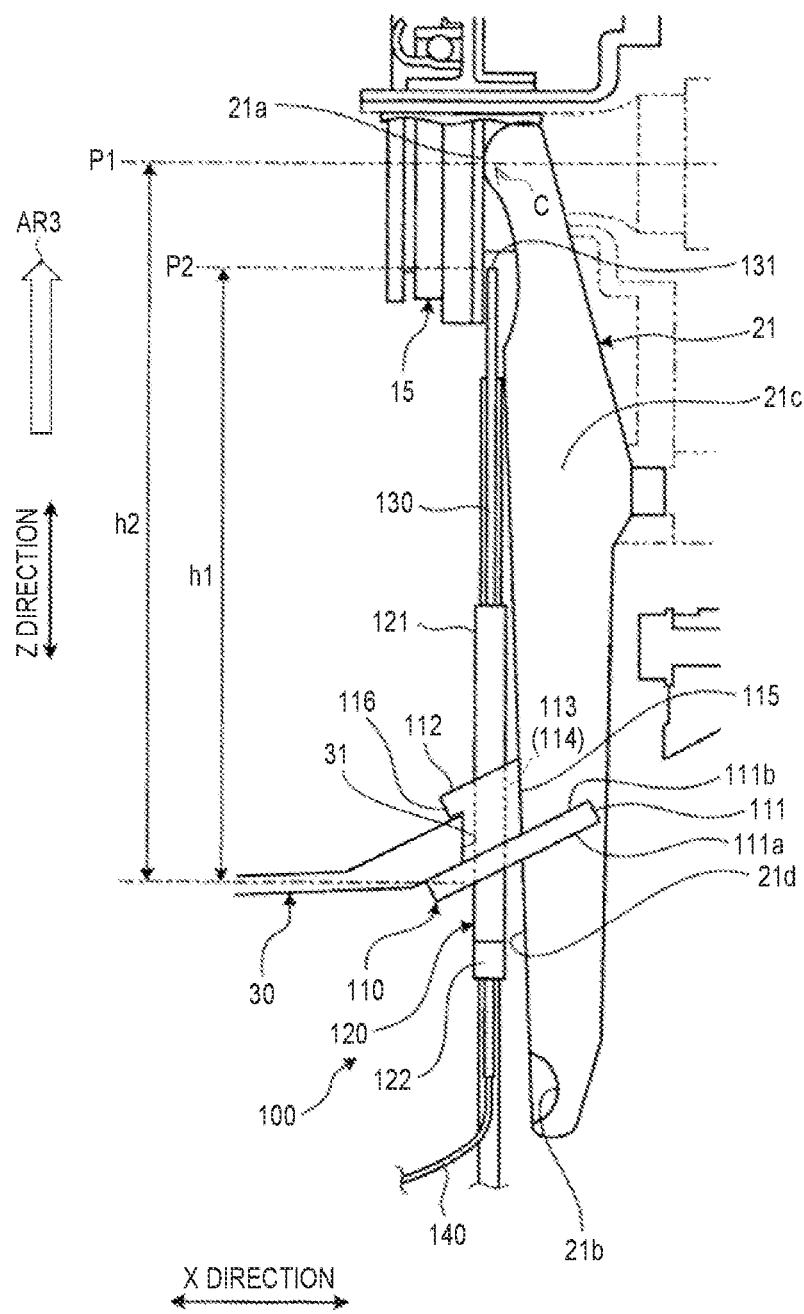
FIG. 9 is a view for illustrating a height position of a tip end portion of the greasing pipe.

Next, a greasing method using the greasing device 100 will be described with reference to FIGS. 7 to 9. FIG. 7 is a view illustrating a state in which the first jig 110 is attached to the through hole 31 of the clutch housing 30. FIG. 8 is a view illustrating a state in which the greasing pipe 130 extends toward the pressing portion 21a of the clutch release fork 21 with the second jig 120 inserted in the insertion hole of the first jig 110. FIG. 9 is a view for illustrating the height position of the tip end portion 131 of the greasing pipe 130. The Z direction illustrated in FIG. 9 represents the height direction. The fork boot 32 will be removed before performing each of the following steps. As a result, the through hole 31 (see FIGS. 2, 9, and the like) of the clutch housing 30 for inserting the greasing pipe 130 and the like is exposed.

As a first step, the first jig 110 is fixed to the through hole 31 of the clutch housing 30 (an example of a fixing target member of the present disclosure).

Figure 11:
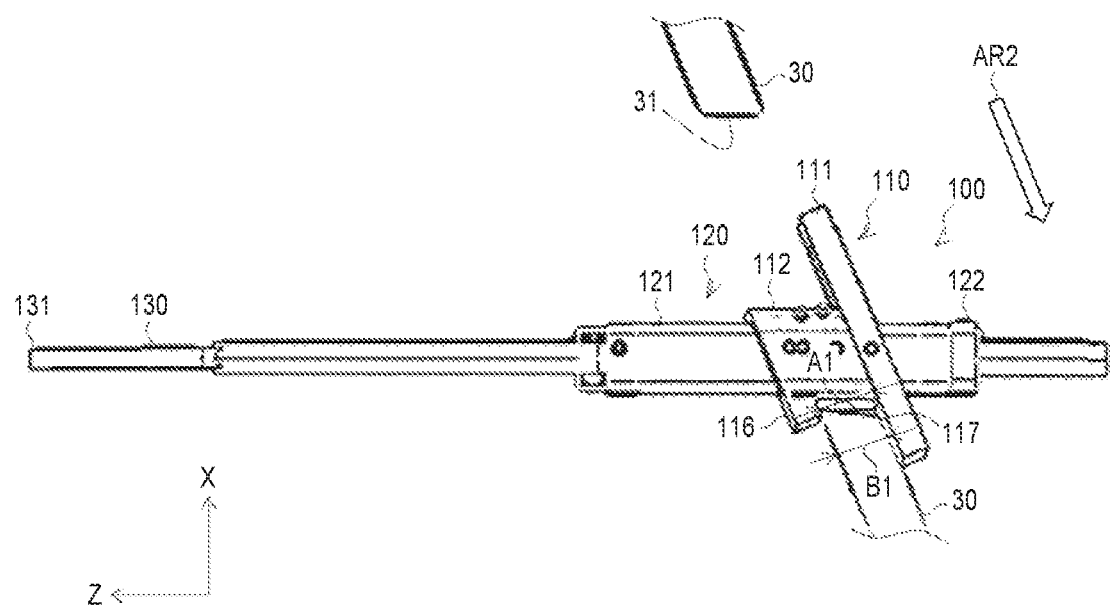
FIG. 11 is a view illustrating a first jig and a second jig extracted from FIG. 9.

FIG. 11 is a view illustrating the first jig 110 and the second jig 120 extracted from FIG. 9.

As illustrated in FIG. 11, the first jig 110 is fixed to the clutch housing 30 (peripheral portion of the through hole 31) in a state of being positioned in the X direction, the Y direction, and the Z direction with respect to the clutch housing 30.

Specifically, first, the protrusion portion 112 of the first jig 110 and the through hole 31 of the clutch housing 30 face each other (see FIG. 2), and the abutment surface 115 of the first jig 110 and the clutch release fork 21 (plane 21d) face each other (contact) (see FIG. 7).

Next, the protrusion portion 112 of the first jig 110 is inserted into the through hole 31, and the first jig 110 is slid along the clutch release fork 21 (plane 21d) in a direction (see the arrow AR1 in FIG. 2) approaching the through hole 31 until the base portion 111 of the first jig 110 abuts on the peripheral portion of the through hole 31 of the clutch housing 30.

By inserting the protrusion portion 112 of the first jig 110 into the through hole 31 and causing side surfaces 112a and 112b of the protrusion portion 112 and the inner surfaces 31a and 31b of the through hole 31 to face (abut) to each other respectively, the first jig 110 is positioned in the Y direction with respect to the clutch housing 30.

Further, by causing the base portion 111 of the first jig 110 to abut on the peripheral portion of the through hole 31 of the clutch housing 30, the first jig 110 is positioned with respect to the clutch housing 30 in the Z direction.

Next, the first jig 110 in a state of being positioned in the Y direction and the Z direction with respect to the clutch housing 30 as described above is pushed in the arrow AR2 direction (see FIGS. 7 and 11).

Specifically, the peripheral portion of the through hole 31 of the clutch housing 30 is inserted (press-fitted) into a space between the base portion 111 and the key portion 116 of the first jig 110 (see FIG. 11), and the first jig 110 in a state of being positioned in the Y direction and the Z direction with respect to the clutch housing 30 as described above is pushed in the arrow AR2 direction (see FIGS. 7 and 11) until the peripheral portion of the through hole 31 hits a bottom portion 117 between the base portion 111 and the key portion 116 of the first jig 110.

A distance A1 (see FIG. 11) between the base portion 111 and the key portion 116 of the first jig 110 and a thickness B1 (see FIG. 11) of the peripheral portion of the through hole 31 of the clutch housing 30 are set such that the relationship of A1<B1 is satisfied. Therefore, when the first jig 110 in a state of being positioned in the Y direction and the Z direction with respect to the clutch housing 30 as described above is pushed in the arrow AR2 direction (see FIGS. 7 and 11), the peripheral portion of the through hole 31 of the clutch housing 30 is inserted (press-fitted) into the space between the base portion 111 and the key portion 116 of the first jig 110. As a result, the first jig 110 is fixed to the clutch housing 30.

By causing the peripheral portion of the through hole 31 of the clutch housing 30 to hit the bottom portion 117 between the base portion 111 and the key portion 116 of the first jig 110, the first jig 110 is positioned with respect to the clutch housing 30 in the X direction.

As described above, the first jig 110 is fixed to the clutch housing 30 (peripheral portion of the through hole 31) in a state of being positioned in the X direction, the Y direction, and the Z direction with respect to the clutch housing 30 (the example of the fixing target member of the present disclosure). In other words, the first jig 110 engages with the peripheral portion of the through hole 31 of the clutch housing 30 in a state of being positioned in the X direction, the Y direction, and the Z direction with respect to the clutch housing 30. The base portion 111 and the key portion 116 of the first jig 110 are examples of engagement portions of the present disclosure.

In a state where the first jig 110 is fixed to the clutch housing 30 (peripheral portion of the through hole 31) in this way, the first hole 113 of the first jig 110 extends toward the corresponding portion C (first pressing portion 21a) (see FIG. 9). Similarly, the second hole 114 of the first jig 110 extends toward the corresponding portion C (second pressing portion 21a). The first jig 110 can be removed from the clutch housing 30 by following a procedure opposite to the above.

As the next step of the first step, a step (insertion step) in which the greasing pipe 130 and the second jig 120 are inserted into the insertion hole (first hole 113, second hole 114) of the first jig 110 fixed to the clutch housing 30 as described above is performed. In this insertion step, when the second jig 120 is inserted into the insertion hole (first hole 113, second hole 114) of the first jig 110, a step of inserting the second jig 120 in two steps is performed. Marking lines described below in a second embodiment are attached to side surfaces 121a and 121b of the insertion portion 121 of the second jig 120 at positions at a predetermined distance from the tip end side. The outer peripheral shape of the insertion portion 121 is formed to be rectangular. The side surfaces 121*a* and 121*b* are short side portions of a rectangle shape. Further, the side surface 121*a* is the first surface in the Y direction, and the side surface 121*b* is the second surface in the Y direction. Further, the rectangle shape of the insertion portion 121 is smaller than the rectangle shape of the opening portion of the first hole 113 and the rectangle shape of the opening portion of the second hole 114.

As illustrated in FIG. 8, by inserting the insertion portion 121 of the second jig 120 into the first hole 113 of the first jig 110, the greasing pipe 130 extends toward the pressing portion 21*a* of the clutch release fork 21 which is the greasing required portion. Since the pressing portion 21*a* has a bifurcated structure, the greasing pipe 130 inserted into the first hole 113 extends toward the first pressing portion 21*a*. By the time the greasing pipe 130 reaches the vicinity of the pressing portion 21*a* of the clutch release fork 21, it may be necessary to avoid obstacles inside the clutch housing 30. For example, an obstacle may be a clip, which is a component of the release bearing 15. Since the clip is provided near the bifurcated structure of the clutch release fork 21, it is desirable that the greasing pipe 130 does not hit the clip before reaching the pressing portion 21*a*.

Here, as a second step (the first half step of the insertion step), the insertion portion 121 of the second jig 120 is inserted into the insertion hole of the first jig 110 up to the position of the marking line. In the inserted state of this second step, the greasing pipe 130 and the endoscope 160 can be operated to displace the position of the second jig 120 with respect to the first jig 110 within the insertion hole such that the greasing pipe 130 and the endoscope 160 can avoid obstacles in the clutch housing 30. That is, as a third step, a step (avoidance operation step) of operating the second jig 120 so as to avoid the internal structure of the clutch housing 30 is performed. In the following steps, while an operator pays close attention to the screen (an image including the tip end portion of the greasing pipe 130 and its surrounding environments (for example, corresponding portion C)) displayed on the display portion 163 attached to the operation portion 162 grasped by one hand (for example, a right hand), the operator performs an operation of inserting the second jig 120 (insertion portion 121) gripped by the other hand (for example, a left hand) into the corresponding portion C in a direction (see FIG. 9) of the arrow AR3 such that the tip end portion 131 of the greasing pipe 130 reaches the corresponding portion C (see FIG. 9).

In the third step, in a state where the insertion portion 121 is inserted into the first hole 113, a clearance (about 0.5 mm) is provided between the side surfaces 121*a* and 121*b* of the insertion portion 121 and the inner surface (inner wall) of the first hole 113. Similarly, in a state where the insertion portion 121 is inserted into the second hole 114, a clearance (about 0.5 mm) is provided between the side surfaces 121*a* and 121*b* of the insertion portion 121 and the inner surface (inner wall) of the second hole 114. Therefore, when the second jig 120 is inserted into the insertion hole up to the position of the marking line, the greasing pipe 130 can be positioned at a height where the greasing pipe 130 does not come into contact with the clip of the release bearing 15 and at a position avoiding the internal structure such as a clip. In this case, it is possible to hold the stopper portion 122 side in the hand and swing the tip end side of the insertion portion 121 in the Y direction.

As illustrated in FIG. 9, the height position of the tip end portion 131 of the greasing pipe 130 is a height at which the tip end portion 131 can avoid the clip of the release bearing 15 at a height h1. In this case, the insertion of the greasing pipe 130 is stopped and the position of the tip end portion 131 is controlled so as to avoid the clip of the release bearing 15. This height h1 also represents the insertion amount (stroke amount).

For example, in the third step, from the state where the side surface 121*b* of the insertion portion 121 is applied to the first surface 113*a* of the first hole 113, as an operation of the greasing pipe 130 to avoid obstacles in the clutch housing 30, the side surface 121*a* of the insertion portion 121 is brought into contact with the second surface 113*b* of the first hole 113 which was in a non-contact state. In this case, the second jig 120 is moved until the insertion portion 121 slides on the third surface 113*c* of the first hole 113 and the side surface 121*a* comes into contact with the second surface 113*b*. This slide includes parallel translation movement in the Y direction and swinging the tip end portion 131 side from the right to the left. As a result, the greasing pipe 130 is in a position where it does not come into contact with the clip.

In this way, after the position of the greasing pipe 130 is fixed at a position at which it can avoid the obstacle in the clutch housing 30, the tip end portion 131 of the greasing pipe 130 is approached the greasing required portion again. That is, the insertion step of the second jig 120 is restarted, and the insertion portion 121 is inserted into the through hole 31 until the stopper portion 122 of the second jig 120 abuts on the base portion 111 of the first jig 110. In a state where the stopper portion 122 of the second jig 120 is in contact with the first jig 110, the tip end portion 131 of the greasing pipe 130 is inserted to a predetermined target position in the clutch housing 30. That is, as a fourth step (the latter half of the insertion step), the insertion portion 121 is inserted deeper than the position of the marking line, and the tip end portion 131 of the greasing pipe 130 is inserted into the greasing required portion.

As illustrated in FIG. 9, in the fourth step, the tip end portion 131 of the greasing pipe 130 reaches a height h2 where one of the bifurcated structures, the first pressing portion 21*a*, is located. In this way, the tip end portion 131 of the greasing pipe 130 can be determined to be in the vicinity of the pressing portion 21*a* of the clutch release fork 21. This height h2 has a larger insertion amount than the height h1.

Then, as a fifth step, a step of supplying grease from the opening portion 131*a* of the greasing pipe 130 is performed. In the fifth step, while paying close attention to the screen (an image including the tip end portion of the greasing pipe 130 and its surrounding environments (for example, corresponding portion C)) displayed on the display portion 163 attached to the operation portion 162 grasped by one hand (for example, the right hand), the operator grasps the greasing vessel 150 with the other hand (for example, the left hand) and operates (for example, pushes the push rod 152 illustrated in FIG. 3 in the axial direction thereof) it so as to supply grease from the opening portion 131*a* of the greasing pipe 130 to the corresponding portion C (see FIG. 9). In the fifth step, when an appropriate amount of grease is supplied from the greasing vessel 150 connected to the greasing pipe 130, an appropriate amount of grease is ejected from the tip end portion 131 of the greasing pipe 130, and the grease is applied to the pressing portion 21*a*. In this case, the grease from the greasing vessel 150 is filled in the greasing pipe 130 in advance. Therefore, when the tip end portion 131 of the greasing pipe 130 is determined to be at a desired position, greasing by operating the greasing vessel 150 is performed smoothly.

Then, when the greasing in the fifth step is completed, the greasing pipe 130 is removed as a sixth step. In the sixth step, the grease from the tip end portion 131 of the greasing pipe 130 is cut while the first jig 110 is attached to the through hole 31. Then, the second jig 120 is removed from the through hole 31, and the tip end portion 131 of the greasing pipe 130 is also removed from the through hole 31 to the outside of the clutch housing 30.

For example, the second jig 120 is removed from the insertion hole of the first jig 110. When the second jig 120 is removed from the insertion hole of the first jig 110, it can be swung right and left by the clearance between the insertion hole and the insertion portion 121. As a result, it is possible to prevent grease from adhering to portions and parts other than the greasing required portion.

When the steps from the first step to the fifth step described above are steps for the first hole 113 the steps from the second step to the fifth step for the second hole 114 are performed. This makes it possible to perform greasing on both the pressing portions 21a with the bifurcated structure while maintaining the attached state of the first jig 110.

When there are no obstacles inside the clutch housing 30 up to the greasing required portion, the above-described second step and third step may be omitted. In this case, the marking line of the second jig 120 is not necessary, and the fourth step may be performed following the first step, and the insertion portion 121 of the second jig 120 may be inserted into the insertion hole of the first jig 110 and continuously inserted until the stopper portion 122 abuts on the first jig 110.

Figure 10A:
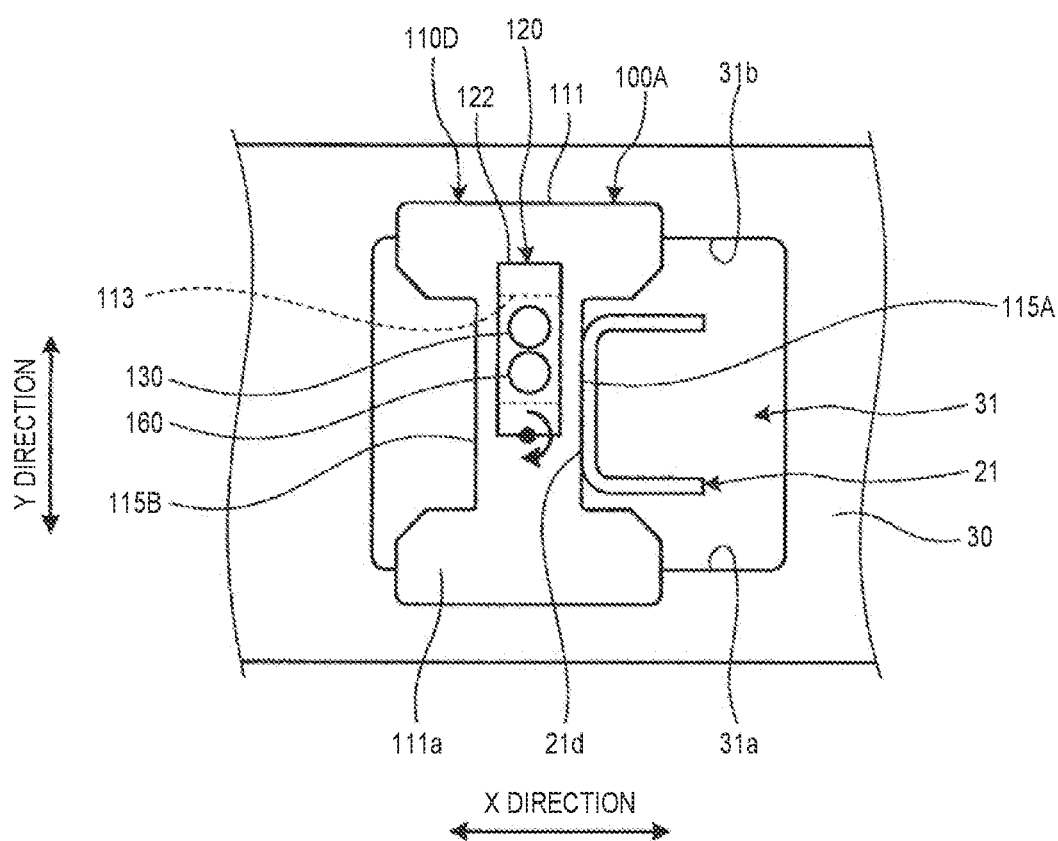
FIG. 10A is a view schematically illustrating a first modification example of the first jig.
Figure 10B:
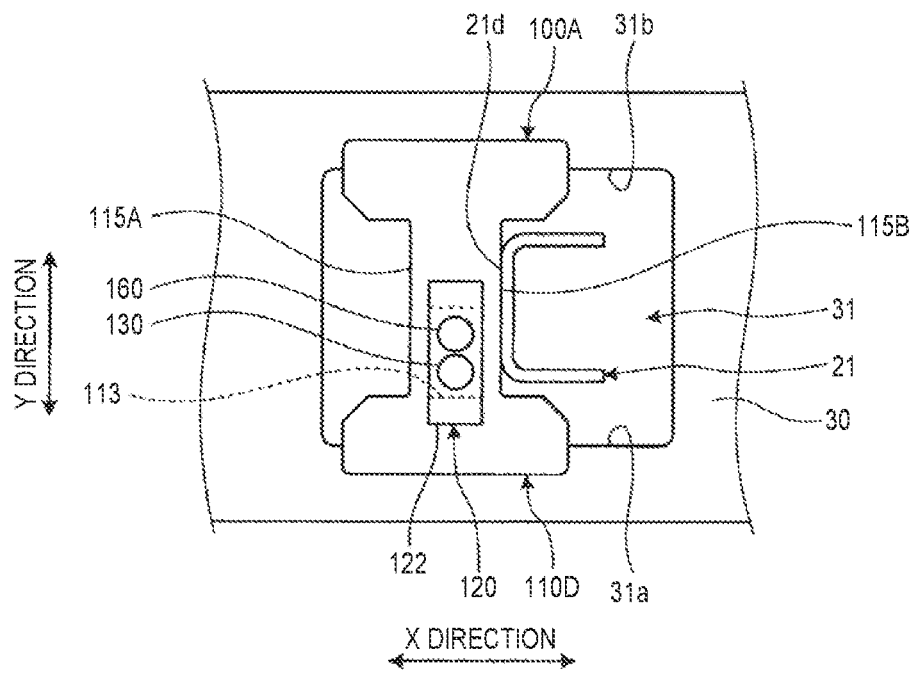
FIG. 10B is a view schematically illustrating the first modification example of the first jig.

FIGS. 10A and 10B schematically show a modification of the first jig 110. A first jig 110D includes the base portion 111, the projecting portion 112, and the first hole 113 for positioning. The first hole 113 is an insertion hole into which the greasing pipe 130, the endoscope 160, and the second jig 120 are inserted. Here, the first hole 113 is disposed at a position displaced from the center of the first jig 110D in the Y direction. As a result, in the greasing device 100A, grease can be applied to a different position by rotating the first jig 110D by 180 degrees and inserting the first jig 110D after the first jig 110D is inserted. FIG. 10A is a schematic diagram when the first jig 110D is inserted. FIG. 10B is a schematic diagram when the first jig 110D in FIG. 10A is rotated by 180 degrees and inserted. In FIG. 10A, a first side surface 115A of the first jig 110D serves as an abutting surface that abuts on the clutch release fork 21. In FIG. 10B, a second side surface 115B of the first jig 110D serves as an abutting surface that abuts on the clutch release fork 21. The greasing pipe 130 is located outside the endoscope 160 with respect to the center in the Y direction. Note that, the endoscope 160 may be located outside the greasing pipe 130 with respect to the center in the Y direction.

As described above, according to the greasing device 100 of the first embodiment, it is possible to perform greasing on the pressing portion 21a of the clutch release fork 21 without removing the clutch housing 30 (or a manual transmission unit including the clutch housing 30) from the vehicle. This facilitates greasing maintenance work and improves workability.

Second Embodiment

Figure 12A:
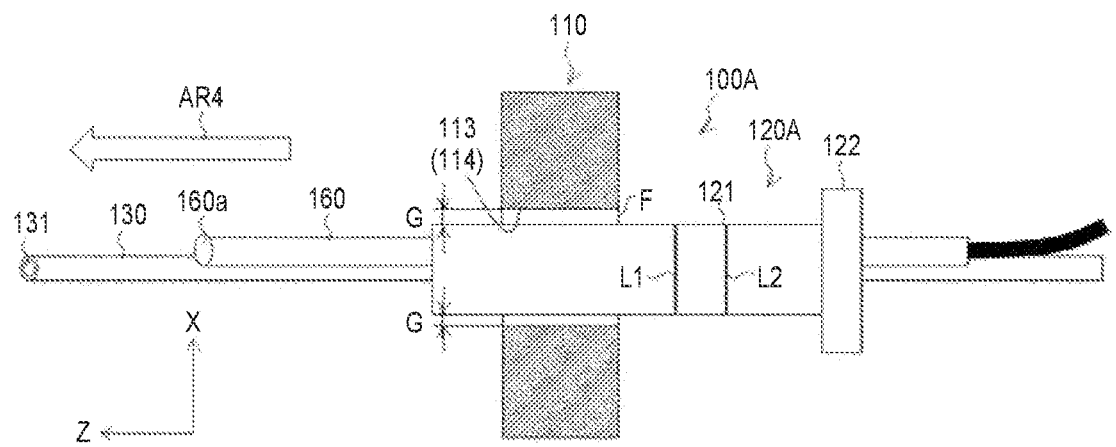
FIG. 12A is a schematic view of an insertion amount grasping device of a second embodiment.
Figure 12B:
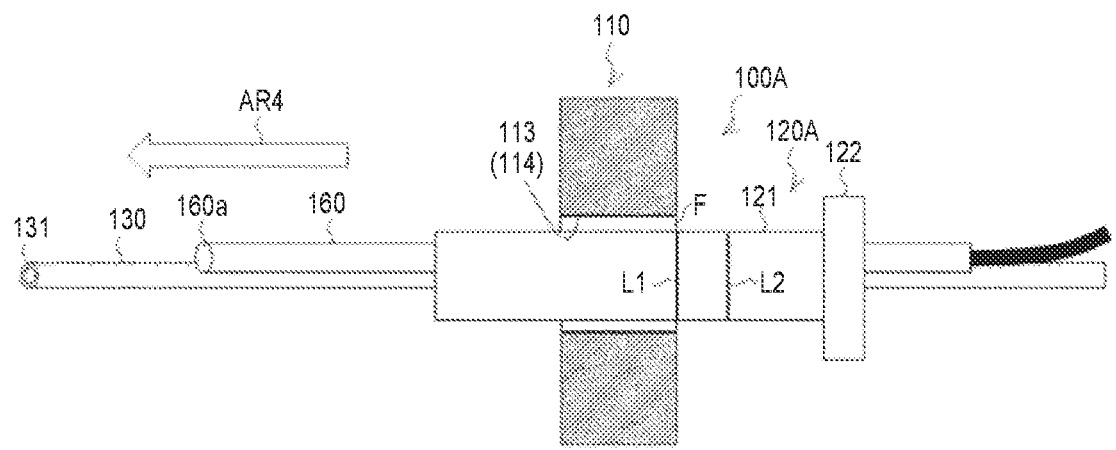
FIG. 12B is a schematic view of the insertion amount grasping device of the second embodiment.
Figure 12C:
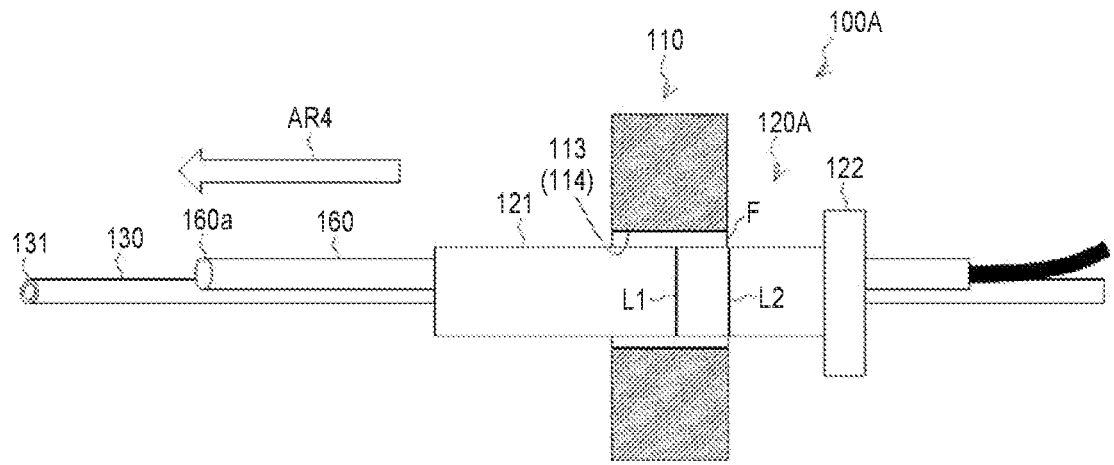
FIG. 12C is a schematic view of the insertion amount grasping device of the second embodiment.

Next, an insertion amount grasping device 100A of a second embodiment (reference example) will be described. FIGS. 12A to 12C are schematic views of the insertion amount grasping device of the second embodiment. FIGS. 12A to 12C illustrate states where the second jig 120 is inserted into the first jig 110 in this order.

The insertion amount grasping device 100A is a device for visually grasping, from the outside of the clutch housing 30, the required insertion amount (hereinafter, also referred to as the required insertion amount) of the second jig 120 with respect to the first jig 110 until the tip end portion 131 of the greasing pipe 130 reaches a position P1 near the corresponding portion C or a position P2 (see FIG. 9) that is a predetermined distance from the corresponding portion C.

The insertion amount grasping device 100A has the same configuration as the greasing device 100 of the first embodiment. However, compared with the greasing device 100 of the first embodiment, the insertion amount grasping device 100A is different in that the insertion portion 121 of the second jig 120 is provided with a first marking line L1 and a second marking line L2.

Hereinafter, the differences from the first embodiment will be mainly described, and the same configurations as those of the first embodiment are designated by the same reference numerals and the description thereof will be omitted as appropriate. In the following description, as described in the first embodiment, the first jig 110 is fixed to the clutch housing 30 (peripheral portion of the through hole 31) in a state of being positioned in the X direction, the Y direction, and the Z direction with respect to the clutch housing 30.

The first jig 110 and the second jig 120 may be made of resin or metal.

As illustrated in FIG. 12A, the insertion portion 121 of the second jig 120 is inserted into the first hole 113 (or the second hole 114) formed in the first jig 110, and is inserted in a direction of the arrow AR4 into the corresponding portion C (see FIG. 9) in a state where the second jig 120 is gripped by the operator. Along with the operation of inserting the second jig 120 into the corresponding portion C, the tip end portion 131 of the greasing pipe 130 eventually reaches the position P2 (see FIG. 9) that is the predetermined distance from the corresponding portion C and the position P1 (see FIG. 9) near the corresponding portion C.

In this way, in order to visually grasp the required insertion amount of the second jig 120 with respect to the first jig 110 until the tip end portion 131 of the greasing pipe 130 reaches the position P2 (see FIG. 9) that is the predetermined distance from the corresponding portion C and the position P1 (see FIG. 9) near the corresponding portion C, as illustrated in FIG. 12A, the first marking line L1 and the second marking line L2 are attached to the insertion portion 121 of the second jig 120. Instead of the marking lines L1 and L2, a marking such as a line drawn with a magic marker or a sticker may be attached to the insertion portion 121 of the second jig 120.

The first marking line L1 is provided at a position where, when the tip end portion 131 of the greasing pipe 130 reaches the position P2 (see FIG. 9) that is the predetermined distance from the corresponding portion C (when the tip end portion 131 of the greasing pipe 130 and the corresponding portion C have a predetermined positional relationship), the first marking line L1 reaches (for example, overlaps with a guide flange F) the first jig 110 (for example, the guide flange F provided on the first jig 110) (see FIG. 12B).

Therefore, by visually confirming the positional relationship between the first marking line L1 and the first jig 110 (for example, the guide flange F provided on the first jig 110) from the outside of the clutch housing 30, the operator can grasp the required insertion amount of the second jig 120 with respect to the first jig 110 until the tip end portion 131 of the greasing pipe 130 reaches the position P2 (see FIG. 9) that is the predetermined distance from the corresponding portion C.

The second marking line L2 is provided at a position where, when the tip end portion 131 of the greasing pipe 130 reaches the position P1 (see FIG. 9) near the corresponding portion C (when the tip end portion 131 of the greasing pipe 130 and the corresponding portion C have a predetermined positional relationship), the second marking line L2 reaches (for example, overlaps with the guide flange F) the first jig 110 (for example, the guide flange F provided on the first jig 110) (see FIG. 12C).

Therefore, by visually confirming the positional relationship between the second marking line L2 and the first jig 110 (for example, the guide flange F provided on the first jig 110) from the outside of the clutch housing 30, the operator can grasp the required insertion amount of the second jig 120 with respect to the first jig 110 until the tip end portion 131 of the greasing pipe 130 reaches the position P1 (see FIG. 9) near the corresponding portion C.

The marking line L1 may be omitted.

As described above, according to the second embodiment, the required insertion amount of the second jig 120 with respect to the first jig 110 until the tip end portion 131 of the greasing pipe 130 reaches the position P1 (see FIG. 9) near the corresponding portion C or the position P2 (see FIG. 9) that is the predetermined distance from the corresponding portion C can be visually grasped from the outside of the clutch housing 30.

Further, according to the second embodiment, there are the following advantages. That is, the required insertion amount (stroke) until the tip end portion 131 of the greasing pipe 130 reaches the vicinity of the corresponding portion C may differ for each vehicle model (for each manual transmission unit). In this case, for each vehicle model with a different required insertion amount (for each manual transmission unit), the insertion portion 121 of the second jig 120 has a marking (for example, a marking line, a line drawn with a magic marker or a sticker) that will reach the first jig 110 (for example, the guide flange F provided on the first jig 110) when the tip end portion 131 of the greasing pipe 130 reaches the vicinity of the corresponding portion C. As a result, it is possible to perform greasing on a plurality of vehicle models (a plurality of manual transmission units) having different required insertion amounts by using one first jig 110. That is, since it is not necessary to prepare the first jig 110 for each vehicle model (for each manual transmission unit), it is possible to suppress an increase in the types of the first jig 110 and an increase in investment (cost) accordingly.

Third Embodiment

Next, an insertion amount grasping device 100B of a third embodiment (reference example) will be described.

Figure 13A:
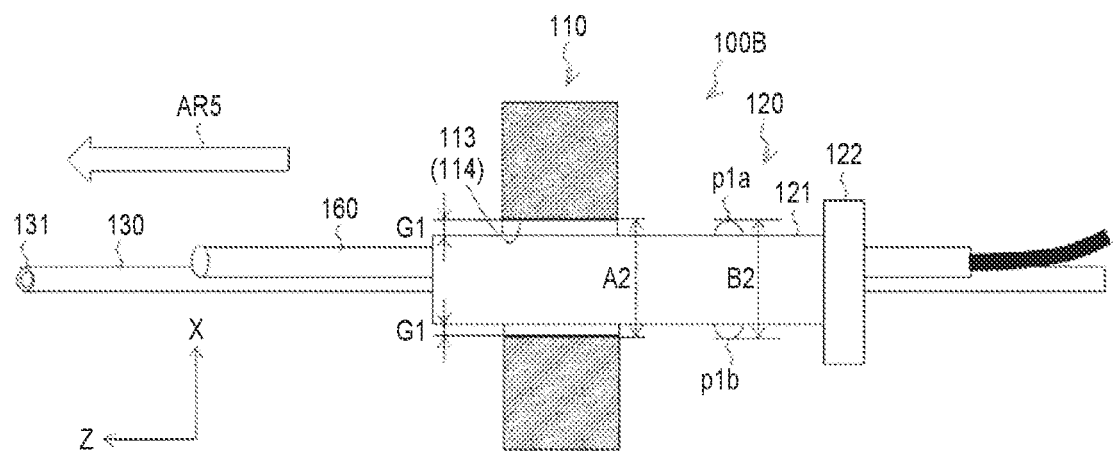
FIG. 13A is a schematic view of an insertion amount grasping device of a third embodiment.
Figure 13B:
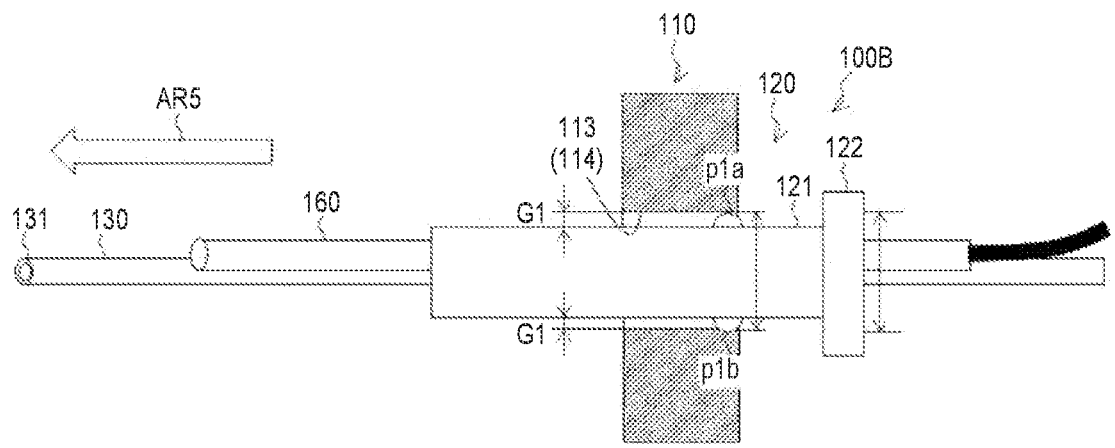
FIG. 13B is a schematic view of the insertion amount grasping device of the third embodiment.

FIGS. 13A to 13B are schematic views of the insertion amount grasping device of the third embodiment. FIGS. 13A to 13B illustrate states where the second jig 120 is inserted into the first jig 110.

The insertion amount grasping device 100B is a device for grasping the fact that (the tip end portion 131 of the greasing pipe 130 and the corresponding portion C have a predetermined positional relationship) the tip end portion 131 of the greasing pipe 130 reaches the position P1 (see FIG. 9) near the corresponding portion C by hand (feeling of the hand holding the second jig 120) instead of visual observation.

The insertion amount grasping device 100B has the same configuration as the greasing device 100 of the first embodiment. However, compared with the greasing device 100 of the first embodiment, the insertion amount grasping device 100B is different in that the insertion portion 121 of the second jig 120 is provided with first protrusion portions p1a, p1b.

Hereinafter, the differences from the first embodiment will be mainly described, and the same configurations as those of the first embodiment are designated by the same reference numerals and the description thereof will be omitted as appropriate. In the following description, as described in the first embodiment, the first jig 110 is fixed to the clutch housing 30 (peripheral portion of the through hole 31) in a state of being positioned in the X direction, the Y direction, and the Z direction with respect to the clutch housing 30.

At least one of the first jig 110 and the second jig 120 is made of resin. When one is made of resin, the other may be made of resin or metal.

As illustrated in FIG. 13A, the insertion portion 121 of the second jig 120 is inserted into the first hole 113 (or the second hole 114) formed in the first jig 110, and is inserted in a direction of the arrow AR5 into the corresponding portion C (see FIG. 9) in a state where the second jig 120 is gripped by the operator. Along with the operation of inserting the second jig 120 into the corresponding portion C, the tip end portion 131 of the greasing pipe 130 eventually reaches the position P1 (see FIG. 9) near the corresponding portion C.

In this way, in order to grasp that the tip end portion 131 of the greasing pipe 130 reaches the position P1 (see FIG. 9) near the corresponding portion C (the tip end portion 131 of the greasing pipe 130 and the corresponding portion C have a predetermined positional relationship), not by visual observation but by hand (the feeling of the hand holding the second jig 120), the first protrusion portions p1a, p1b are provided on the insertion portion 121 of the second jig 120.

The first protrusion portions p1a, p1b are, for example, protrusion portions having hemispherical shapes. The first protrusion portions p1a, p1b are not limited to the hemispherical shape, and may be protrusion portions having other shapes.

When the second jig 120 is inserted into the first hole 113 (or the second hole 114) (see FIG. 13B) into the corresponding portion C, and the tip end portion 131 of the greasing pipe 130 reaches the position P1 (see FIG. 9) near the corresponding portion C, the first protrusion portions p1a, p1b are provided at positions where the first protrusion portions p1a, p1b cause friction (friction force) with the first hole 113 (or the second hole 114).

To cause this friction, as illustrated in FIG. 13A, a diameter A2 (design dimension) of the first hole 113 (and second hole 114) and a thickness B2 (design dimension) of the insertion portion 121 of the second jig 120 including the first protrusion portions p1a, p1b are set so as to satisfy the relationship of A2<B2.

Therefore, the operator can grasp that (the friction described above) the tip end portion 131 of the greasing pipe 130 reaches the position P1 (see FIG. 9) near the corresponding portion C due to the operation of inserting the second jig 120 into the corresponding portion C by hand (feeling of the hand holding the second jig 120) instead of by visual observation.

As described above, according to the third embodiment, the fact that the tip end portion 131 of the greasing pipe 130 reaches the position P1 (see FIG. 9) near the corresponding portion C (the tip end portion 131 of the greasing pipe 130 and the corresponding portion C have a predetermined positional relationship) can be grasped not by visual observation but by hand (feeling of the hand holding the second jig 120).

This is due to the fact that the first protrusion portions p1a, p1b are provided at positions where the first protrusion portions p1a and p1b cause friction (friction force) with the first hole 113 (or the second hole 114) when the second jig 120 is inserted into the first hole 113 (or the second hole 114) (see FIG. 13B) toward the corresponding portion C, and the tip end portion 131 of the greasing pipe 130 reaches the position P1 (see FIG. 9) near the corresponding portion C (when the tip end portion 131 of the greasing pipe 130 and the corresponding portion C have a predetermined positional relationship).

Therefore, while paying close attention to the screen (an image including the tip end portion of the greasing pipe 130 and its surrounding environments (for example, corresponding portion C)) displayed on the display portion 163 attached to the operation portion 162 grasped by one hand (for example, the right hand), the operator can concentrate on the operation of inserting the second jig 120 (insertion portion 121) grasped by the other hand (for example, the left hand) into the corresponding portion C in the direction of the arrow AR5 such that the tip end portion 131 of the greasing pipe 130 reaches the position P1 (see FIG. 9) near the corresponding portion C.

Further, according to the third embodiment, there are the following advantages. That is, as described above, when the first protrusion portions p1a, p1b are inserted into the first hole 113 (or the second hole 114), the friction generated between the first protrusion portions p1a, p1b and the inner wall of the first hole 113 (or the second hole 114) causes the second jig 120 to be fixed to the first jig 110. Further, the gap (clearance) between the insertion portion 121 of the second jig 120 inserted into the first hole 113 (or the second hole 114) and the inner wall of the first hole 113 (or the second hole 114) is about 0.5 mm.

Therefore, when the friction described occurs, the position of the tip end portion 131 of the greasing pipe 130 with respect to the corresponding portion C does not change (almost does not change) even when the operator releases the second jig 120 with the hand holding the second jig 120.

Therefore, when the friction described above occurs, that is, when the tip end portion 131 of the greasing pipe 130 reaches the position P1 (see FIG. 9) near the corresponding portion C, by releasing the other hand (for example, the left hand) that had previously held the second jig 120, and newly grasping and operating the greasing vessel 150 with the other free hand (for example, with the left hand) (for example, pushing the push rod 152 illustrated in FIG. 3 in the axial direction thereof), grease can be supplied to the corresponding portion C from the opening portion 131a of the greasing pipe 130. That is, one operator can perform operations of inserting the second jig 120 into the corresponding portion C, and subsequently supplying grease from the opening portion 131a of the greasing pipe 130 to the corresponding portion C. This improves work efficiency.

Fourth Embodiment

Next, an insertion amount grasping device 100C of a fourth embodiment (reference example) will be described.

Figure 14A:
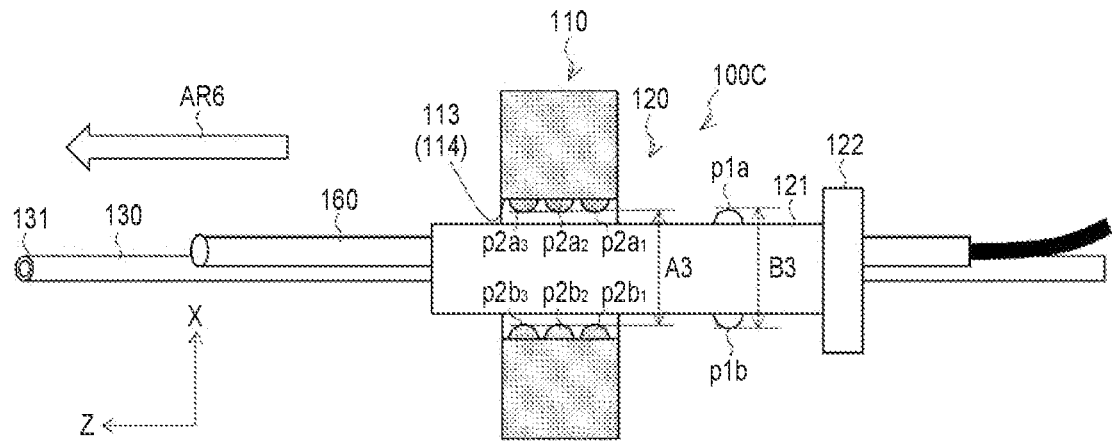
FIG. 14A is a schematic view of an insertion amount grasping device of a fourth embodiment.
Figure 14B:
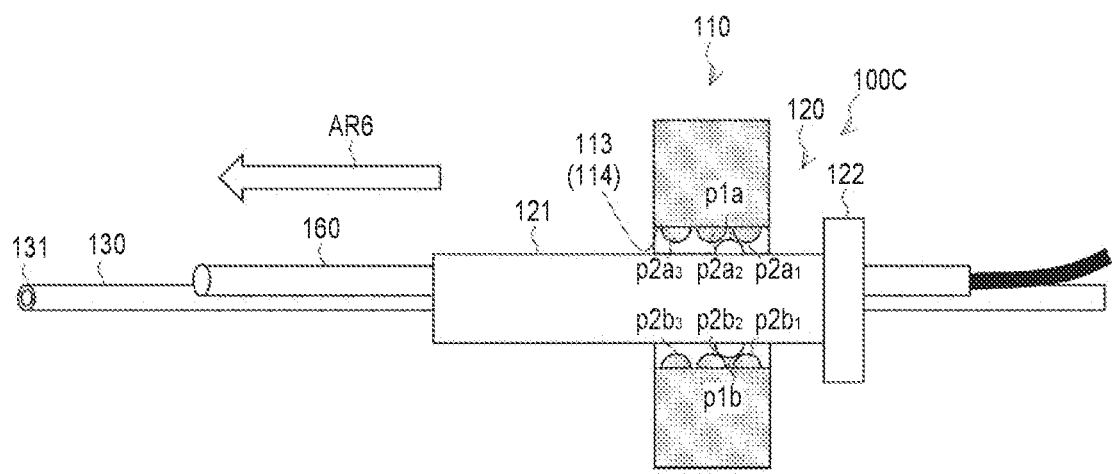
FIG. 14B is a schematic view of the insertion amount grasping device of the fourth embodiment.
Figure 14C:
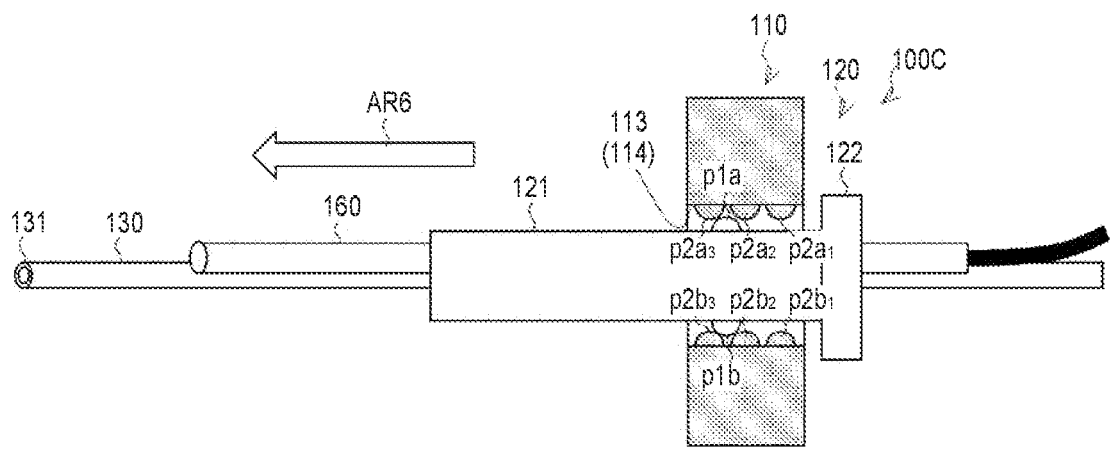
FIG. 14C is a schematic view of the insertion amount grasping device of the fourth embodiment.

FIGS. 14A to 14C are schematic views of the insertion amount grasping device of the fourth embodiment. FIGS. 14A to 14C illustrate states where the second jig 120 is inserted into the first jig 110.

The insertion amount grasping device 100C is a device for grasping the fact that the tip end portion 131 of the greasing pipe 130 reaches the position P2 (see FIG. 9) that is the predetermined distance from the corresponding portion C, or the position P1 (see FIG. 9) near the corresponding portion C (the tip end portion 131 of the greasing pipe 130 and the corresponding portion C have a predetermined positional relationship) by hand (feeling of the hand holding the second jig 120) instead of by visual observation.

The insertion amount grasping device 100C has the same configuration as the greasing device 100 of the first embodiment. However, compared with the greasing device 100 of the first embodiment, the insertion amount grasping device 100C is different in that first protrusion portions p1a, p1b are provided on the insertion portion 121 of the second jig 120, and second protrusion portions p2a (p2$a_1$, p2$a_2$, p2$a_3$), p2b (p2$b_1$, p2$b_2$, p2$b_3$) are provided on the inner wall of the first hole 113 (and the second hole 114) formed in the first jig 110.

Hereinafter, the differences from the first embodiment will be mainly described, and the same configurations as those of the first embodiment are designated by the same reference numerals and the description thereof will be omitted as appropriate. In the following description, as described in the first embodiment, the first jig 110 is fixed to the clutch housing 30 (peripheral portion of the through hole 31) in a state of being positioned in the X direction, the Y direction, and the Z direction with respect to the clutch housing 30.

At least one of the first jig 110 and the second jig 120 is made of resin. When one is made of resin, the other may be made of resin or metal.

As illustrated in FIG. 14A, the insertion portion 121 of the second jig 120 is inserted into the first hole 113 (or the second hole 114) formed in the first jig 110, and is inserted in a direction of an arrow AR6 into the corresponding portion C (see FIG. 9) in a state where the second jig 120 is gripped by the operator. Along with the operation of inserting the second jig 120 into the corresponding portion C, the tip end portion 131 of the greasing pipe 130 eventually reaches the position P2 (see FIG. 9) that is the predetermined distance from the corresponding portion C, and then the tip end portion 131 of the greasing pipe 130 reaches the position P1 (see FIG. 9) near the corresponding portion C.

In this way, in order to grasp that the tip end portion 131 of the greasing pipe 130 reaches the position P2 (see FIG. 9) that is the predetermined distance from the corresponding portion C, and the position P1 (see FIG. 9) near the corresponding portion C (the tip end portion 131 of the greasing pipe 130 and the corresponding portion C have a predetermined positional relationship), not by visual observation but by hand (the feeling of the hand holding the second jig 120), the insertion portion 121 of the second jig 120 is provided with the first protrusion portions p1a, p1b. Further, the second protrusion portions p2a (p2$a_1$, p2$a_2$, p2$a_3$), p2b (p2$b_1$, p2$b_2$, p2$b_3$) are provided on the inner wall of the first hole 113 (and the second hole 114) formed in the first jig 110.

The first protrusion portions p1a, p1b, and the second protrusion portions p2a (p2$a_1$, p2$a_2$, p2$a_3$), p2b (p2$b_1$, p2$b_2$, p2$b_3$) are, for example, protrusion portions having hemispherical shapes. The first protrusion portions p1a, p1b, and the second protrusion portions p2a (p2$a_1$, p2$a_2$, p2$a_3$), p2b ($p2b_1$, $p2b_2$, $p2b_3$) are not limited to the hemispherical shape, and may be protrusion portions having other shapes.

The first protrusion portions p1a, p1b are provided at positions where they are inserted into the first hole 113 (or the second hole 114) when, along with the operation of inserting the second jig 120 into the corresponding portion C, the tip end portion 131 of the greasing pipe 130 reaches the position P2 (see FIG. 9) that is the predetermined distance from the corresponding portion C, and then the tip end portion 131 of the greasing pipe 130 reaches the position P1 (see FIG. 9) near the corresponding portion C (see FIGS. 14B and 14C).

The second protrusion portions p2a ($p2a_1$, $p2a_2$, $p2a_3$), p2b ($p2b_1$, $p2b_2$, $p2b_3$) are arranged in a row along an insertion direction (see the arrow AR6 in FIG. 14) of the second jig 120.

The first protrusion portions p1a and p1b pass through the respective second protrusion portions p2a ($p2a_1$, $p2a_2$, $p2a_3$), p2b ($p2b_1$, $p2b_2$, $p2b_3$) while causing friction with the respective second protrusion portions p2a ($p2a_1$, $p2a_2$, $p2a_3$) and p2b ($p2b_1$, $p2b_2$, $p2b_3$) due to the operation of inserting the second jig 120 into the corresponding portion C.

To cause this friction, as illustrated in FIG. 14A, a diameter A3 (design dimension) of the first hole 113 (and the second hole 114) including the second protrusion portions p2a ($p2a_1$, $p2a_2$, $p2a_3$), p2b ($p2b_1$, $p2b_2$, $p2b_3$) and a thickness B3 (design dimension) of the insertion portion 121 of the second jig 120 including the first protrusion portions p1a, p1b are set so as to satisfy the relationship of A3<B3.

Therefore, the operator can grasp that (the friction described above) the tip end portion 131 of the greasing pipe 130 reaches the position P2 (see FIG. 9) that is the predetermined distance from the corresponding portion C, and then the tip end portion 131 of the greasing pipe 130 reaches the position P1 (see FIG. 9) near the corresponding portion C due to the operation of inserting the second jig 120 into the corresponding portion C by hand (feeling of the hand holding the second jig 120) instead of visual observation. For example, when the first protrusion portions p1a, p1b pass through the second protrusion portions $p2a_1$, $p2b_1$ while abutting (or press-fitting) the second protrusion portion $p2a_1$, $p2b_1$ due to the operation of inserting the second jig 120 into the corresponding portion C, the operator can grasp that (the friction described above) the tip end portion 131 of the greasing pipe 130 reaches the position P2 (see FIG. 9) that is a predetermined distance from the corresponding portion C, not by visual observation but by hand (the feeling of the hand holding the second jig 120). Further, when the first protrusion portions p1a, p1b pass through the second protrusion portions $p2a_2$, $p2b_2$ while abutting (or press-fitting) on the second protrusion portions $p2a_2$, $p2b_2$ due to the operation of further inserting the second jig 120 into the corresponding portion C, the operator can grasp that (the friction described above) the tip end portion 131 of the greasing pipe 130 reaches the position P1 (see FIG. 9) near the corresponding portion C, not by visual observation but by hand (the feeling of the hand holding the second jig 120).

As described above, according to the fourth embodiment, the fact that the tip end portion 131 of the greasing pipe 130 reaches the position P1 (see FIG. 9) near the corresponding portion C (the tip end portion 131 of the greasing pipe 130 and the corresponding portion C have a predetermined positional relationship) can be grasped not by visual observation but by hand (feeling of the hand holding the second jig 120).

This is due to the fact that the first protrusion portions p1a, p1b and the second protrusion portions p2a ($p2a_1$, $p2a_2$, $p2a_3$), p2b ($p2b_1$, $p2b_2$, $p2b_3$) are provided at positions where both protrusion portions cause friction (friction force) when the tip end portion 131 of the greasing pipe 130 reaches the position P2 (see FIG. 9) that is the predetermined distance from the corresponding portion C, and then the tip end portion 131 of the greasing pipe 130 reaches the position P1 (see FIG. 9) near the corresponding portion C due to the operation of inserting the second jig 120 into the corresponding portion C (when the tip end portion 131 of the greasing pipe 130 and the corresponding portion C have a predetermined positional relationship).

Therefore, while paying close attention to the screen (an image including the tip end portion of the greasing pipe 130 and its surrounding environments (for example, corresponding portion C)) displayed on the display portion 163 attached to the operation portion 162 grasped by one hand (for example, the right hand), the operator can concentrate on the operation of inserting the second jig 120 (insertion portion 121) grasped by the other hand (for example, the left hand) into the corresponding portion C in the direction of the arrow AR6 such that the tip end portion 131 of the greasing pipe 130 reaches the position P2 (see FIG. 9) that is the predetermined distance from the corresponding portion C, and then the tip end portion 131 of the greasing pipe 130 reaches the position P1 (see FIG. 9) near the corresponding portion C.

Further, according to the fourth embodiment, there are the following advantages. That is, as described above, when the tip end portion 131 of the greasing pipe 130 reaches the position P1 (see FIG. 9) near the corresponding portion C and the first protrusion portions p1a, p1b are inserted into the first hole 113 (or the second hole 114) (see FIG. 14C), the second jig 120 is in a state of being fixed to the first jig 110. Further, the gap (clearance) between the insertion portion 121 of the second jig 120 inserted into the first hole 113 (or the second hole 114) and the inner wall of the first hole 113 (or the second hole 114) is about 0.5 mm.

Therefore, when the tip end portion 131 of the greasing pipe 130 reaches the position P1 (see FIG. 9) near the corresponding portion C, and the first protrusion portions p1a, p1b are inserted into the first hole 113 (or the second hole 114), (see FIG. 14C), the position of the tip end portion 131 of the greasing pipe 130 with respect to the corresponding portion C does not change (almost does not change) even when the operator releases the second jig 120 with the hand holding the second jig 120.

Therefore, when the tip end portion 131 of the greasing pipe 130 reaches the position P1 (see FIG. 9) near the corresponding portion C, by releasing the second jig 120 with the other hand (for example, the left hand) holding the second jig 120, and newly grasping and operating the greasing vessel 150 with the other free hand (for example, the left hand) (for example, pushing the push rod 152 illustrated in FIG. 3 in the axial direction thereof), grease can be supplied to the corresponding portion C from the opening portion 131a of the greasing pipe 130. That is, one operator can perform operations of inserting the second jig 120 into the corresponding portion C, and subsequently supplying grease from the opening portion 131a of the greasing pipe 130 to the corresponding portion C. This improves work efficiency.

Further, according to the fourth embodiment, there are the following advantages. That is, the required insertion amount (stroke) until the tip end portion 131 of the greasing pipe 130 reaches the vicinity of the corresponding portion C may differ for each vehicle model (for each manual transmission unit). In this case, for each vehicle model with a different required insertion amount (for each manual transmission unit), the second protrusion portions p2a (p2a$_1$, p2a$_2$, p2a$_3$), p2b (p2b$_1$, p2b$_2$, p2b$_3$) are arranged such that the friction (friction force) occurs when the tip end portion 131 of the greasing pipe 130 reaches the vicinity of the corresponding portion C. As a result, it is possible to perform greasing on a plurality of vehicle models (a plurality of manual transmission units) having different required insertion amounts by using one first jig 110. That is, since it is not necessary to prepare the first jig 110 for each vehicle model (for each manual transmission unit), it is possible to suppress an increase in the types of the first jig 110 and an increase in investment (cost) accordingly.

Figure 15:
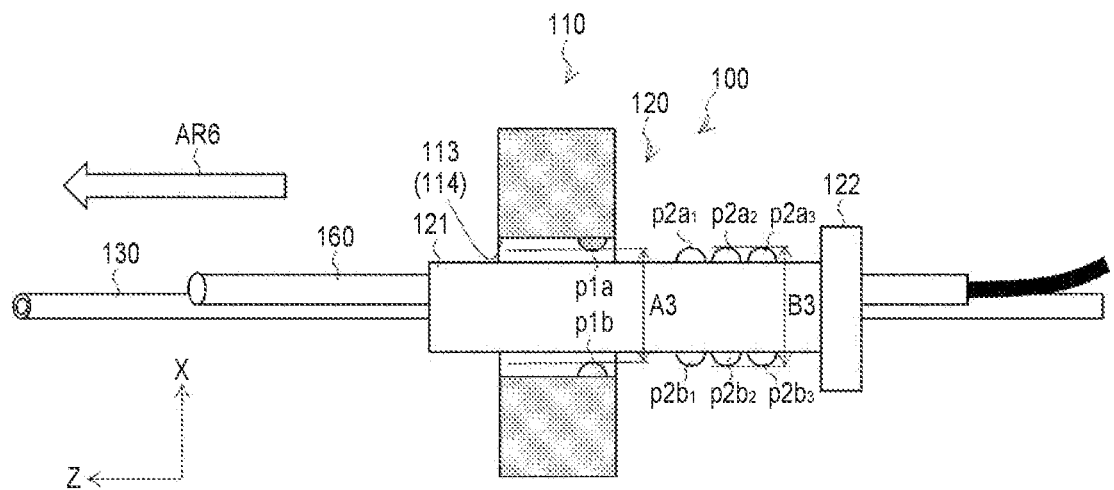
FIG. 15 is a schematic view of an insertion amount grasping device (modification example) of the fourth embodiment.

Next, a modification example will be described. FIG. 15 is a schematic view of the insertion amount grasping device (modification example) of the fourth embodiment.

In the fourth embodiment, as illustrated in FIG. 14A, an example in which the first protrusion portions p1a, p1b are provided in the insertion portion 121 of the second jig 120, and the second protrusion portions p2a (p2a$_1$, p2a$_2$, p2a$_3$), p2b (p2b$_1$, p2b$_2$, p2b$_3$) are provided on the inner wall of the first hole 113 (and the second hole 114) formed in the first jig 110 is described. However, the applicable embodiment is not limited to this.

As illustrated in FIG. 15, for example, conversely, the second protrusion portions p2a (p2a$_1$, p2a$_2$, p2a$_3$), p2b (p2b$_1$, p2b$_2$, p2b$_3$) may be provided in the insertion portion 121 of the second jig 120, and the first protrusion portions p1a, p1b may be provided in the inner wall of the first hole 113 (and the second hole 114) formed in the first jig 110.

Further, in the fourth embodiment, the example using three second protrusion portions p2a (p2a$_1$, p2a$_2$, p2a$_3$) on one side and three second protrusion portions p2b (p2b$_1$, p2b$_2$, p2b$_3$) on the other side is described, but the applicable embodiment is not limited to this. For example, four or more second protrusion portions p2a on one side and four or more second protrusion portions p2b on the other side may be used.

Next, modification examples of the first to fourth embodiments will be described.

In the first to fourth embodiments described above, the example in which grease is used as a fluid substance is described, but the applicable embodiment is not limited to this. For example, a fluid may be used as the fluid substance. In this case, the corresponding portion C is the portion where the fluid needs to be supplied. Further, as the fluid substance, a fluid substance other than grease and fluid may be used.

Further, in the third and fourth embodiments, the example in which the first protrusion portions p1a, p1b are provided in the insertion portion 121 of the second jig 120 is described, but the applicable embodiment is not limited to this. For example, when the second jig 120 is omitted, the first protrusion portions p1a, p1b may be provided on the greasing pipe 130.

Further, in the first to fourth embodiments described above, the example in which the greasing pipe 130 is provided in the second jig 120 is described, but the applicable embodiment is not limited to this. For example, the greasing pipe 130 may be omitted. In this way, the endoscope 160 can be used to inspect narrow spaces. In this case, the corresponding portion C is a place that requires a narrow space inspection. Further, in the first to fourth embodiments, the examples in which the endoscope 160 is provided in the second jig 120 are described, but the applicable embodiment is not limited to this. For example, the endoscope 160 may be omitted.

Further, in the first to fourth embodiments, the examples in which the insertion amount grasping device of the present disclosure is applied to the vehicle field (grease injection maintenance of the clutch release mechanism) are described, but the applicable embodiment is not limited thereto. For example, the insertion amount grasping device of the present disclosure may be applied to various fields other than vehicles, for example medicine. For example, in the first to fourth embodiments described above, the examples in which the clutch housing 30 (peripheral portion of the through hole 31) is used as a fixing target member are described, but the applicable embodiment is not limited to this. That is, as the fixing target member, a fixing target member corresponding to the field to which the insertion amount grasping device of the present disclosure is applied may be used. Similarly, in the first to fourth embodiments, the examples in which the clutch housing 30 is used as the cover member are described, but the applicable embodiment is not limited to this. That is, as the cover member, a cover member corresponding to the field to which the insertion amount grasping device of the present disclosure is applied may be used.

Fifth Embodiment

Next, an injection device of a fifth embodiment (reference example) will be described.

Figure 16:
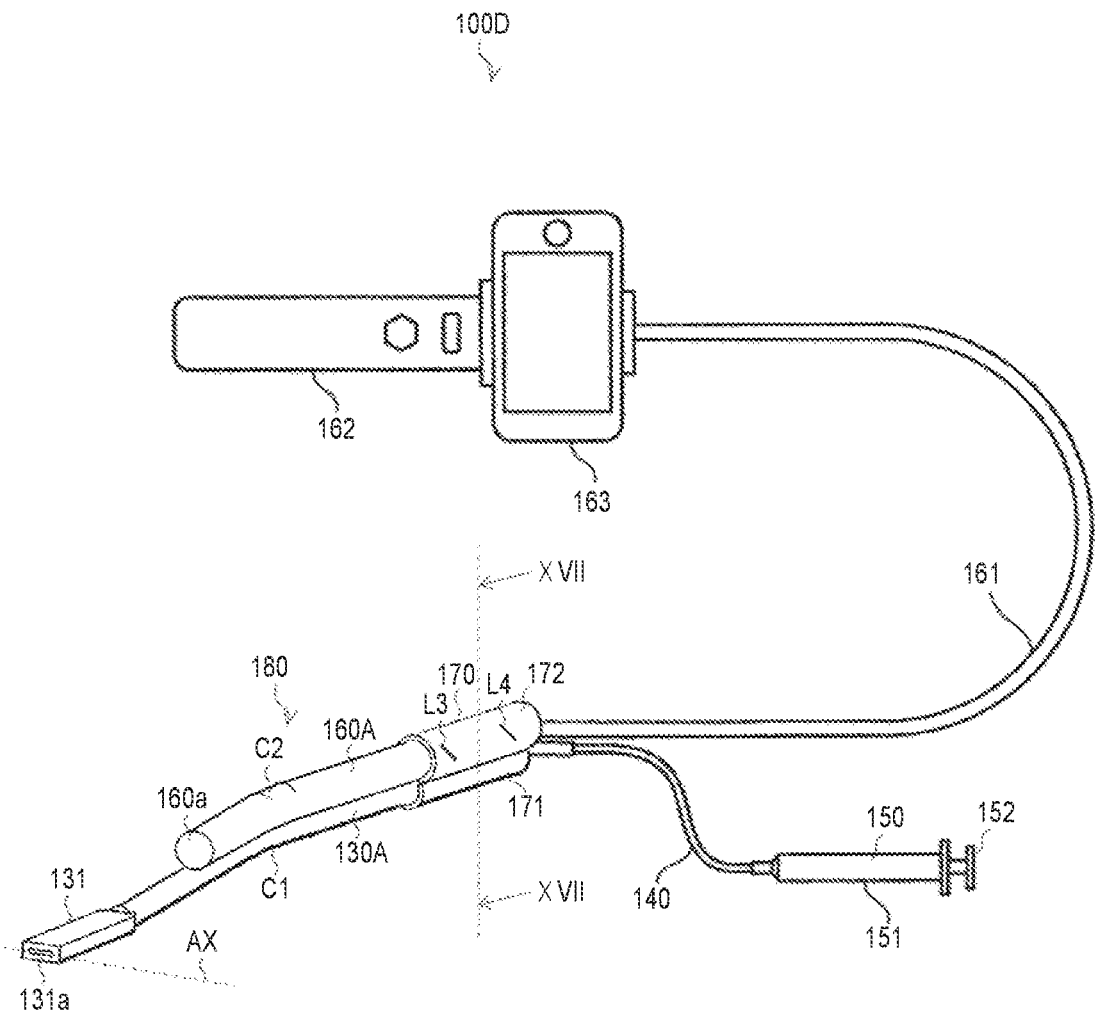
FIG. 16 is a configurational view of an injection device.

FIG. 16 is a configurational view of an injection device 100D.

The injection device 100D of the fifth embodiment is different from that of the first embodiment in that it mainly does not include the first jig 110 and the second jig 120 and includes a holding member 170. Hereinafter, the differences from that of the first embodiment will be mainly described, and the same components as those of the first embodiment will be designated by the same reference numerals and the description thereof will be omitted as appropriate.

Figure 22:
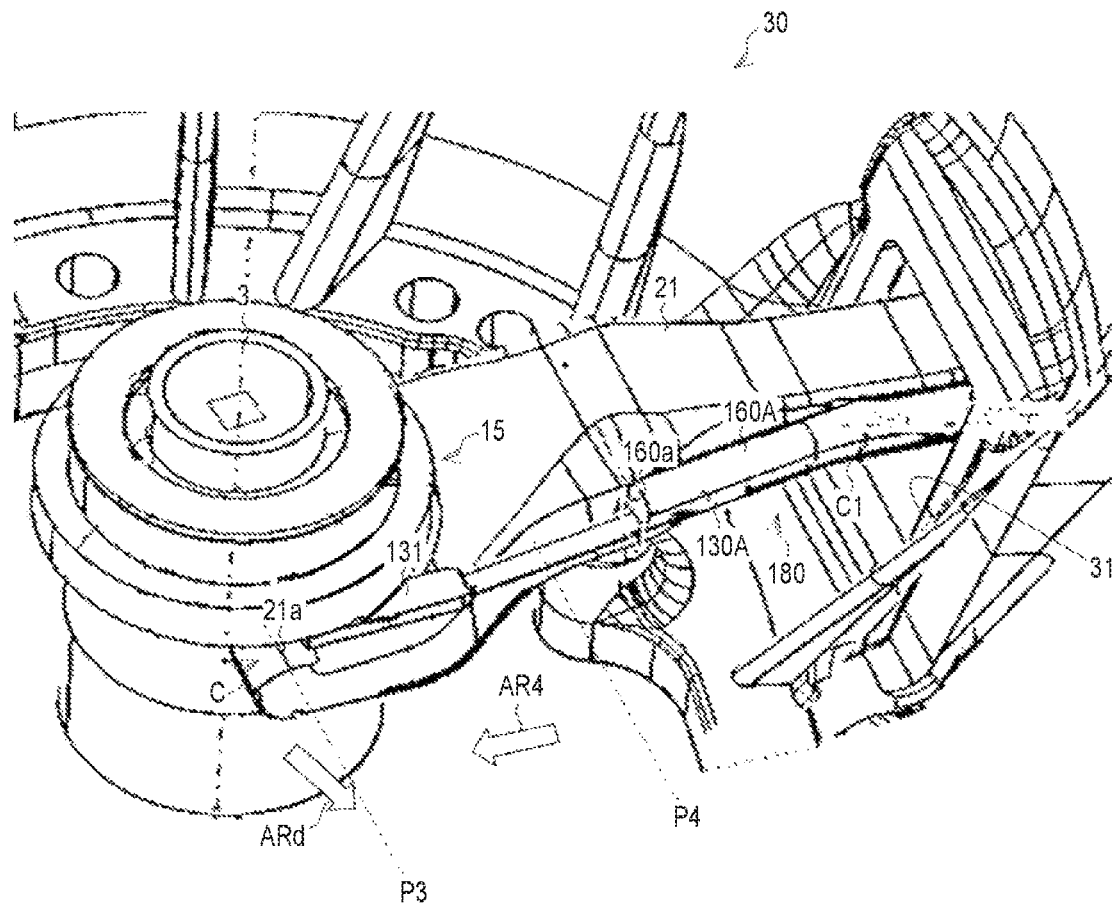
FIG. 22 is a view illustrating a state in which the greasing pipe extends toward the corresponding portion on the front side in a state where the insertion portion is inserted into the through hole of the clutch housing.

Similar to the first embodiment, the injection device 100D of the fifth embodiment includes an insertion portion 180 (see FIG. 16) that is inserted into the corresponding portion C in a narrow space while being gripped by an operator. The insertion portion 180 includes a greasing pipe 130A, an endoscope 160A, and a holding member 170. Hereinafter, similar to the first embodiment, the case where the narrow space is a greasing required place (a place where grease needs to be supplied from the tip end portion 131 of the greasing pipe 130A) between the clutch release fork 21 (pressing portion 21a) and the release bearing 15 will be described as an example. One end side of the clutch release fork 21 is composed of a pressing portion 21a that presses the release bearing 15 in the axial direction (see FIG. 22). The pressing portion 21a is configured to have a bifurcated structure in which the tip end side is bifurcated so as to pinch the input shaft 3 inside the clutch housing 30. In FIG. 22, the corresponding portion C on the front side is illustrated, but the corresponding portion C on the back side is arranged behind the release bearing 15 and is not illustrated.

The greasing pipe 130A is a long injection portion including a tip end portion 131 from which grease (an example of the fluid substance of the present disclosure) is injected, similar to the greasing pipe 130 of the first embodiment. This greasing pipe 130A is made of metal. To make it easier to insert the tip end portion 131 of the greasing pipe 130A into a portion between the clutch release fork 21 (pressing portion 21a) and the release bearing 15, which is the greasing required portion, the tip end portion 131 of the greasing pipe 130A has a quadrangular cylindrical shape having a horizontally long rectangular cross section (see FIG. 16). The greasing pipe 130A has a cylindrical shape except for the tip end portion 131. The greasing pipe 130A may have a cylindrical shape including the tip end portion 131.

The layout of the internal structure of the clutch housing 30 may differ depending on the vehicle model (for each manual transmission unit). Depending on the layout of the internal structure of the clutch housing 30, the route for inserting the insertion portion 180 (greasing pipe 130A and endoscope 160A) from the through hole 31 of the clutch housing 30 into the corresponding portion C may be linear, or the insertion route may include one or more bent portions in the middle.

In the latter case, when the greasing pipe 130A extends linearly like the greasing pipe 130 of the first embodiment, the insertion portion 180 (greasing pipe 130A and endoscope 160A) interferes with the obstacle inside the clutch housing 30. Therefore, it is difficult to insert the insertion portion 180 (greasing pipe 130A and endoscope 160A) into the corresponding portion C.

Therefore, in the fifth embodiment, assuming that the path for inserting the insertion portion 180 (greasing pipe 130A and endoscope 160A) includes a bent portion in the middle, a portion C1 between the base end portion and the tip end portion is bent. This makes it relatively easy to insert the insertion portion 180 (greasing pipe 130A and endoscope 160A) into the corresponding portion C even when there is a bent portion in the middle of the path through which the insertion portion 180 (greasing pipe 130A and endoscope 160A) is inserted, Depending on the path through which the insertion portion 180 (greasing pipe 130A and endoscope 160A) is inserted, the greasing pipe 130A may be bent at a plurality of points between the base end portion and the tip end portion.

The tip end portion 131 (tip end surface) of the greasing pipe 130A is provided with an injection port 131a for injecting grease supplied through a cylindrical pipe portion. A flexible pipe 140 is connected to the base end side of the greasing pipe 130A. The greasing pipe 130A is connected to the greasing vessel 150 via the flexible pipe 140.

The endoscope 160A is a long imaging device including an imaging unit for capturing an image including the tip end portion 131 of the greasing pipe 130A and its surrounding environments (for example, the corresponding portion C) in the tip end portion 160a. The endoscope 160A has a cylindrical shape having a diameter larger than that of the greasing pipe 130A, and a portion C2 between the base end portion and the tip end portion is bent at the same angle as the greasing pipe 130A. Similar to the greasing pipe 130A, the endoscope 160A may be bent at a plurality of points between the base end portion and the tip end portion depending on the path through which the insertion portion 180 (greasing pipe 130A and endoscope 160A) is inserted.

The base end side of the endoscope 160A is connected to the operation portion 162 via the cable 161. By operating the operation portion 162, it is possible to capture an image of the internal structure of the clutch housing 30 with the endoscope 160A. The image (for example, the image including the tip end portion 131 of the greasing pipe 130A and its surrounding environments (for example, the corresponding portion C)) taken by the endoscope 160A can be displayed on the display portion 163 attached to the operation portion 162.

Next, the holding member 170 will be described.

As illustrated in FIG. 16, the holding member 170 holds the greasing pipe 130A and the endoscope 160A in parallel and in an adjacently arranged manner.

Figure 17:
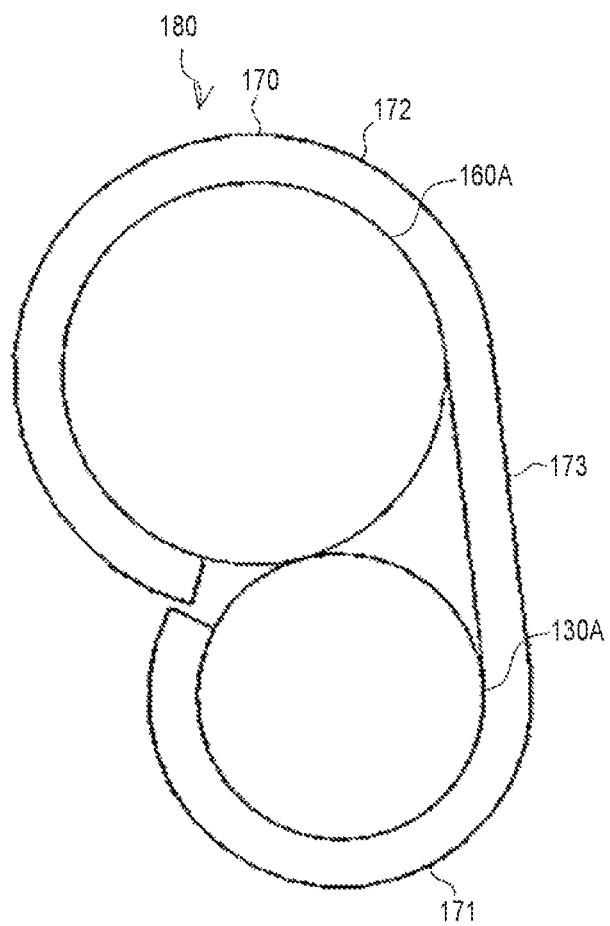
FIG. 17 is a cross-sectional view taken along the line XVII-XVII of FIG. 16.
Figure 18:
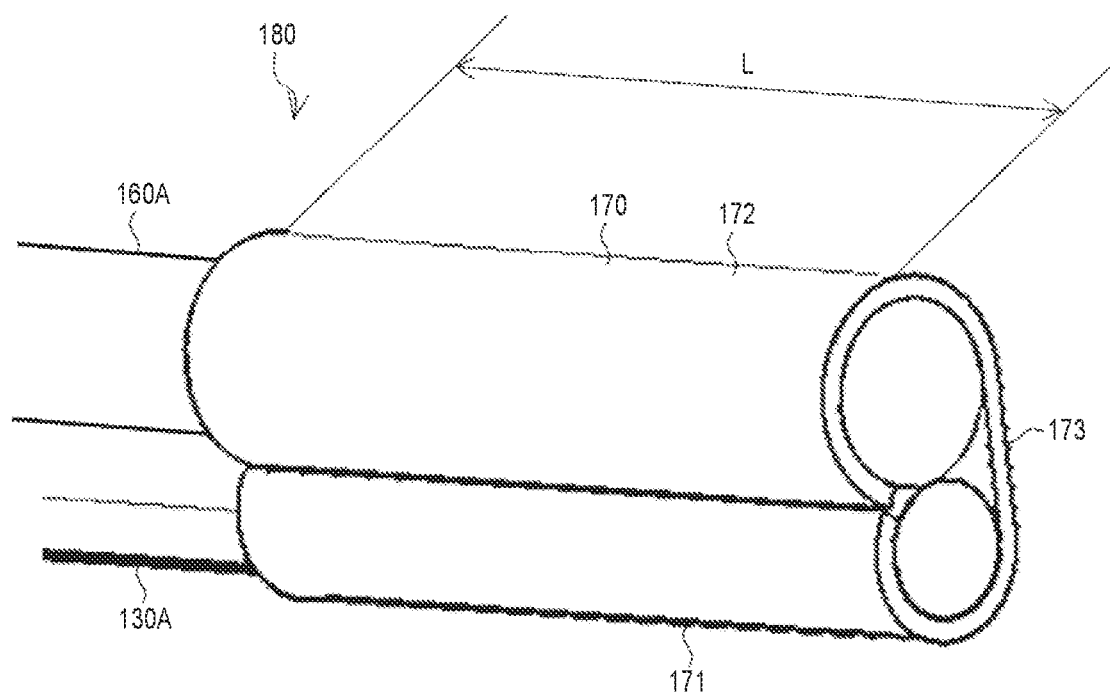
FIG. 18 is a perspective view of a holding member.

FIG. 17 is a cross-sectional view taken along the line XVII-XVII of FIG. 16, and FIG. 18 is a perspective view of the holding member 170.

As illustrated in FIGS. 17 and 18, the holding member 170 includes an injection-portion insertion portion 171 into which the greasing pipe 130A (cylindrical portion on the base end portion side) is press-fitted, an imaging-unit insertion portion 172 into which the endoscope 160A (cylindrical portion on the base end portion side) is press-fitted, and a first connection portion 173 which connects the injection-portion insertion portion 171 and the imaging-unit insertion portion 172.

The injection-portion insertion portion 171 is a first semi-cylindrical portion into which a greasing pipe 130A (cylindrical portion on the base end portion side) is press-fitted. The imaging-unit insertion portion 172 is a second semi-cylindrical portion into which the endoscope 160A (cylindrical portion on the base end portion side) is press-fitted. The first connection portion 173 is a flat portion connecting one end portion of the first semi-cylindrical portion (injection-portion insertion portion 171) and one end portion of the second semi-cylindrical portion (imaging-unit insertion portion 172). Hereinafter, the first connection portion 173 is also referred to as a flat portion 173. This flat portion (first connection portion 173) extends in a tangential direction of the first semi-cylindrical portion (injection-portion insertion portion 171) and the second semi-cylindrical portion (imaging-unit insertion portion 172) (see FIG. 17).

The first semi-cylindrical portion (injection-portion insertion portion 171) is formed in a state where a first end portion of the plate is folded back into a semi-cylindrical shape. Similarly, the second semi-cylindrical portion (imaging-unit insertion portion 172) is formed in a state where a second end portion of the plate is folded back into a semi-cylindrical shape. The first connection portion 173 is a plate portion between the first semi-cylindrical portion (injection portion insertion portion 171) and the second semi-cylindrical portion (imaging-unit insertion portion 172).

The holding member 170 (plate) is made of synthetic resin or spring steel. That is, the holding member 170 may be formed by performing injection-molding with a synthetic resin, or may be formed by bending or pressing a plate-shaped spring steel.

An axial length L (see FIG. 18) of the holding member 170 is set to a length (for example, L=40 mm) suitable for fixing the greasing pipe 130A and the endoscope 160A to each other.

The diameter of the injection-portion insertion portion 171 is slightly larger than the diameter of the greasing pipe 130A. Therefore, the injection-portion insertion portion 171 is elastically deformed when the greasing pipe 130A is inserted, and is fixed to the greasing pipe 130A (cylindrical portion on the base end portion side) in a state of being in close contact with the outer peripheral surface of the greasing pipe 130A (cylindrical portion on the base end portion side) due to the restoring force thereof.

Similarly, the diameter of the imaging-unit insertion portion 172 is slightly larger than the diameter of the endoscope 160A. Therefore, the imaging-unit insertion portion 172 is elastically deformed when the endoscope 160A is inserted, and is fixed to the endoscope 160A (cylindrical portion on the base end portion side) in a state of being in close contact with the outer peripheral surface of the endoscope 160A (cylindrical portion on the base end portion side) due to the restoring force thereof.

Figure 19:
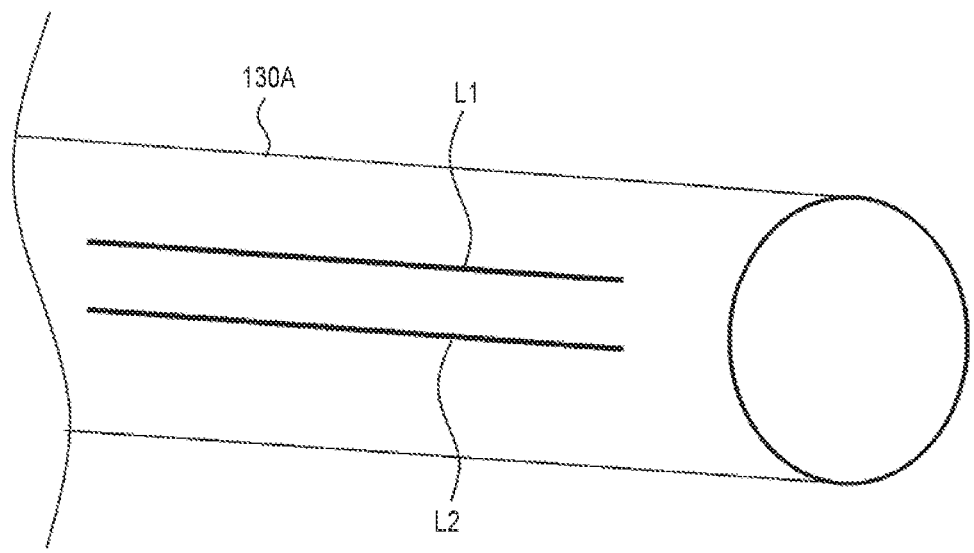
FIG. 19 is a perspective view of a greasing pipe (cylindrical portion on a base end portion side)

FIG. 19 is a perspective view of the greasing pipe 130A (cylindrical portion on the base end portion side).

As illustrated in FIG. 19, the outer peripheral surface of the greasing pipe 130A is provided with a first marking line L1 and a second marking line L2 extending in the axial direction. The marking lines L1, L2 are used to arrange the endoscope 160A at an appropriate angle position with respect to the greasing pipe 130A. This will be described below. The marking lines L1, L2 are examples of the markings on the injection portion side of the present disclosure. The markings on the injection portion side are not limited to the marking lines L1, L2, and may be other markings such as lines drawn with a magic marker or a sticker and attached to the outer peripheral surface of the greasing pipe 130A.

Figure 20:
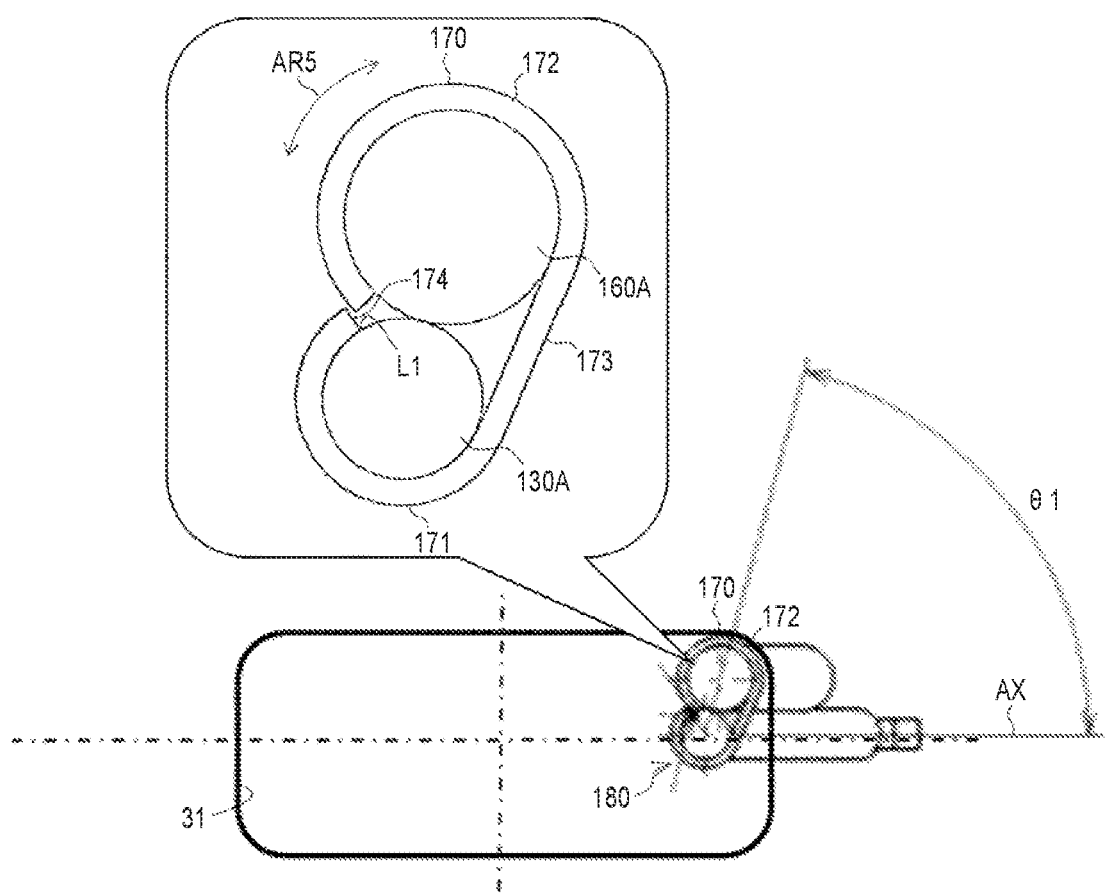
FIG. 20 is a view illustrating a state in which an insertion portion is inserted into a through hole of a clutch housing in order to supply grease to a corresponding portion on a front side.
Figure 21:
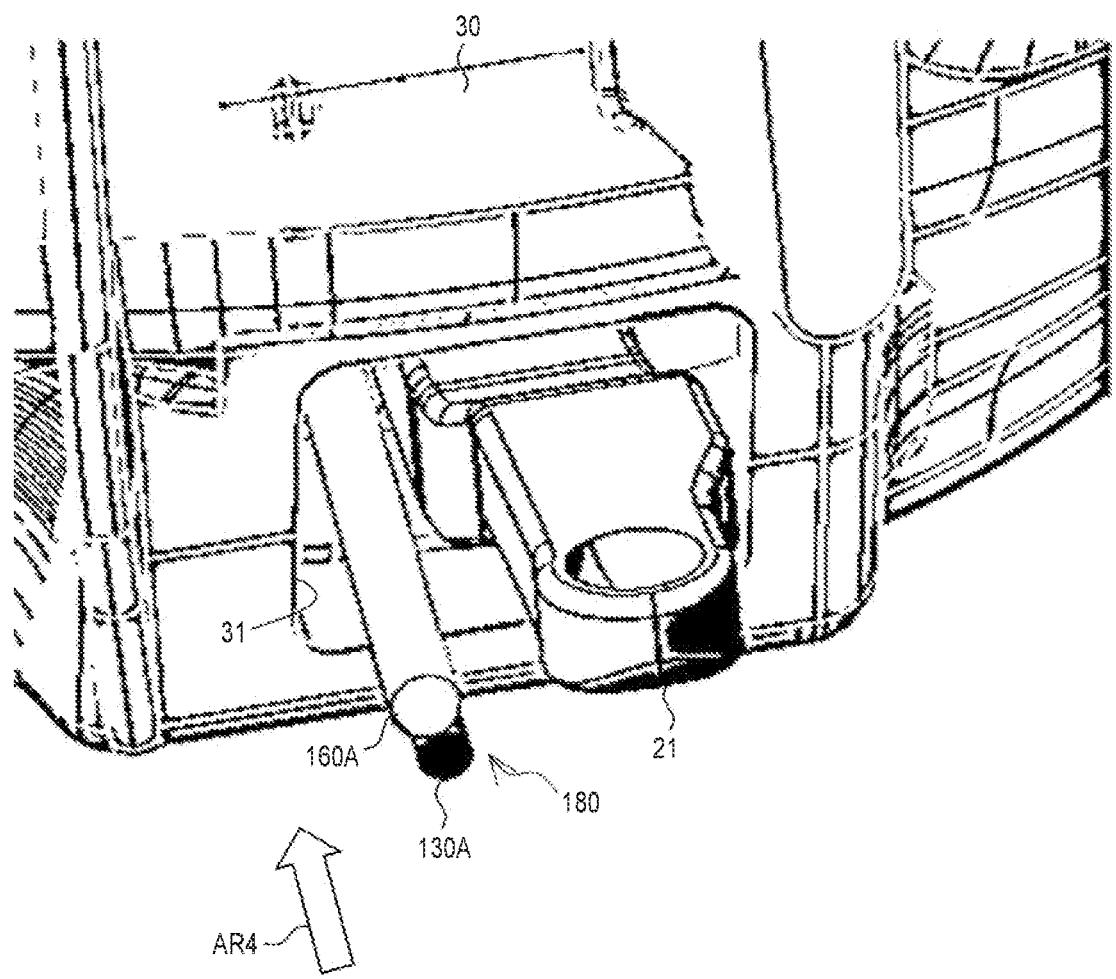
FIG. 21 is a view illustrating a state in which the insertion portion is inserted into the through hole of the clutch housing in order to supply grease to the corresponding portion on the front side.

Next, a greasing method using the injection device 100D will be described with reference to FIGS. 20 to 22. FIGS. 20 and 21 are views illustrating a state in which the insertion portion 180 is inserted into the through hole 31 of the clutch housing 30 in order to supply grease to the corresponding portion C on the front side. FIG. 20 is a view of the through hole 31 seen from a direction opposite to the arrow AR4 in FIG. 22. FIG. 22 is a view illustrating a state in which the greasing pipe 130A extends toward the corresponding portion C on the front side in a state where the insertion portion 180 is inserted into the through hole 31 of the clutch housing 30.

The fork boot 32 is removed before performing each of the following steps. As a result, the through hole 31 (see FIG. 21 and the like) of the clutch housing 30 for inserting the insertion portion 180 is exposed.

Hereinafter, in FIG. 22, an example of greasing in the order of the corresponding portion C on the front side and the corresponding portion C on the back side will be described. In FIG. 22, the corresponding portion C on the back side is arranged behind the release bearing 15 and is not illustrated.

First, as a first step, to prevent (and to secure the field of view of the endoscope 160A) the insertion portion 180 (greasing pipe 130A and endoscope 160A) inserted into the corresponding portion C on the front side from interfering with obstacles inside the clutch housing 30, the operator arranges the endoscope 160A at an appropriate angle position with respect to the greasing pipe 130A according to the layout of the internal structure of the clutch housing 30.

This is realized by rotating (see the arrow AR5 in FIG. 20) the holding member 170 in a state of holding the greasing pipe 130A and the endoscope 160A with respect to the greasing pipe 130A, and matching (see FIG. 20) a winding finish end portion 174 on the injection-portion insertion portion 171 side of the holding member 170 with the first marking line L1 (see FIG. 19) attached to the outer peripheral surface of the greasing pipe 130A.

The first marking line L1 is provided at a position where the winding finish end portion 174 on the injection-portion insertion portion 171 side matches the first marking line L1 when the endoscope 160A is arranged at a position of an angle θ1 (see FIG. 20) with respect to the greasing pipe 130A (reference line AX). In the case of FIG. 20, the angle θ1 is, for example, 75°. The winding finish end portion 174 on the injection-portion insertion portion 171 side is an example of the marking on the holding member side of the present disclosure. The marking on the holding member side is not limited to the winding finish end portion 174 on the injection-portion insertion portion 171 side, and may be another marking such as a line drawn with a magic marker or a seal and attached to the holding member 170. The reference line AX extends in a direction parallel to the upper surface (see FIG. 16) of the quadrangular cylindrical tip end portion 131 of the greasing pipe 130A (see FIG. 16).

Therefore, by visually confirming the positional relationship between the winding finish end portion 174 on the injection-portion insertion portion 171 side of the holding member 170 and the first marking line L1, the operator can grasp that the endoscope 160A is arranged at the position of the angle θ1 (see FIG. 20) with respect to the greasing pipe 130A (reference line AX).

Next, as a second step, the operator inserts the insertion portion 180 in which the endoscope 160A is arranged at the position of the angle θ1 through the through hole 31 of the clutch housing 30. The through hole 31 of the clutch housing 30 is an example of "an opening portion or a notch portion formed in a partition wall between the operator and the corresponding portion" of the present disclosure. In this case, as illustrated in FIG. 20, the insertion portion 180 is inserted while causing the imaging-unit insertion portion 172 of the holding member 170 to be in contact with a corner portion (right corner portion in FIG. 20) corresponding to the corresponding portion C on the front side of the through hole 31 of the clutch housing 30, that is, while guiding the insertion direction of insertion portion 180 into the corresponding portion C on the front side. As described above, in the fifth embodiment, the guide function is realized by the corner portion of the through hole 31 of the clutch housing 30 and the imaging-unit insertion portion 172 of the holding member 170.

Figure 23:
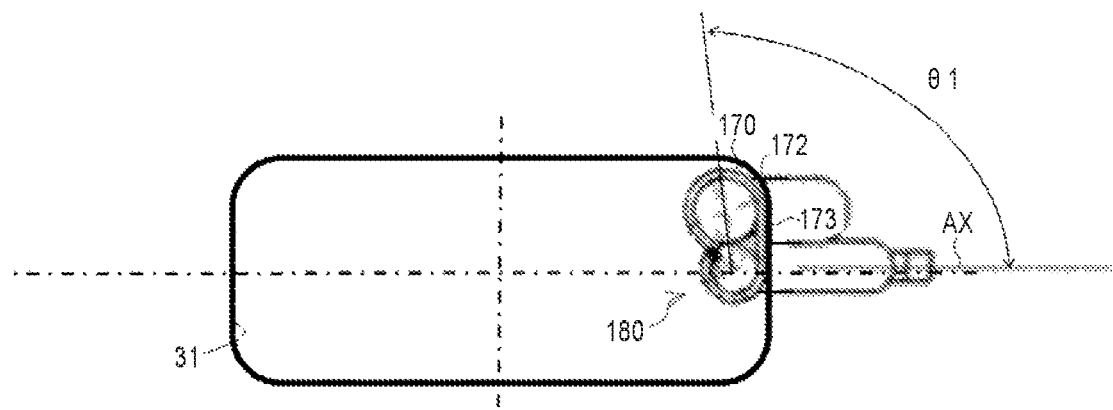
FIG. 23 is a view (modification example) illustrating a state in which the insertion portion is inserted into the through hole of the clutch housing in order to supply grease to the corresponding portion on the front side.

The guide function may be realized as follows. FIG. 23 is a view (modification example) illustrating a state in which the insertion portion 180 is inserted into the through hole 31 of the clutch housing 30 in order to supply grease to the corresponding portion C on the front side. That is, as illustrated in FIG. 23, the insertion portion 180 may be inserted while not only the imaging-unit insertion portion 172 of the holding member 170, but also the flat portion 173 is in contact with the corner portion (right corner portion in FIG. 23) corresponding to the corresponding portion C on the front side of the through hole 31 of the clutch housing 30. This is an example of realizing the guide function by the corner portion of the through hole 31 of the clutch housing 30, the imaging-unit insertion portion 172 and the flat portion 173 of the holding member 170. In the case of FIG. 23, the angle θ1 is, for example, 100°.

In the following steps, while paying close attention to the screen (an image including the tip end portion of the greasing pipe 130A and its surrounding environments (for example, the corresponding portion C on the front side)) displayed on the display portion 163 attached to the operation portion 162 gripped with one hand (for example, the right hand), the operator inserts the insertion portion 180 gripped by the other hand (for example, the left hand) into the corresponding portion C on the front side in the direction of the arrow AR4 (see FIGS. 21 and 22), such that the tip end portion 131 of the greasing pipe 130A reaches the corresponding portion C on the front side.

Along with the operation of inserting the insertion portion 180 into the corresponding portion C on the front side, the tip end portion 131 of the greasing pipe 130A eventually reaches a position P4 (see FIG. 22) that is a predetermined distance from the corresponding portion C on the front side, and then it reaches a position P3 (see FIG. 22) near the corresponding portion C on the front side.

In this way, in order to visually grasp the required insertion amount until the tip end portion 131 of the greasing pipe 130A reaches the position P4 that is the predetermined distance from the corresponding portion C and the position P3 near the corresponding portion C, as illustrated in FIG. 16, the holding member 170 is attached with a third marking line L3 and a fourth marking line L4. Instead of the marking lines L3 and L4, a marking such as a line drawn with a magic marker or a sticker may be attached to the holding member 170.

The third marking line L3 is provided at a position where the third marking line L3 matches the through hole 31 of the clutch housing 30 when the tip end portion 131 of the greasing pipe 130A reaches the position P4 (see FIG. 22) that is the predetermined distance from the corresponding portion C (when the tip end portion 131 of the greasing pipe 130A and the corresponding portion C have a predetermined positional relationship).

Therefore, by visually confirming the positional relationship between the third marking line L3 and the through hole 31 of the clutch housing 30, the operator can grasp the required insertion amount until the tip end portion 131 of the greasing pipe 130A reaches the position P4 (see FIG. 22) that is the predetermined distance from the corresponding portion C. Further, it can be grasped that the tip end portion 131 of the greasing pipe 130A has reached the position P4 (see FIG. 22) that is the predetermined distance from the corresponding portion C.

The fourth marking line L4 is provided at a position where the fourth marking line L4 matches the through hole 31 of the clutch housing 30 when the tip end portion 131 of the greasing pipe 130A reaches the position P3 (see FIG. 22) near the corresponding portion C (when the tip end portion 131 of the greasing pipe 130A and the corresponding portion C have a predetermined positional relationship).

Therefore, by visually confirming the positional relationship between the fourth marking line L4 and the through hole 31 of the clutch housing 30, the operator can grasp the required insertion amount until the tip end portion 131 of the greasing pipe 130A reaches the position P3 (see FIG. 22) near the corresponding portion C. Further, it can be grasped that the tip end portion 131 of the greasing pipe 130 has reached the position P3 (see FIG. 22) near the corresponding portion C.

The third marking line L3 may be omitted.

Next, when the fourth marking line L4 matches the through hole 31 of the clutch housing 30, that is, when the tip end portion 131 of the greasing pipe 130A reaches the position P3 (see FIG. 22) near the corresponding portion C on the front side, as a third step, the operator inserts (see FIG. 22) the tip end portion 131 of the greasing pipe 130A between the clutch release fork 21 (pressing portion 21a) and the release bearing 15, and supplies grease to the corresponding portion C on the front side from the injection port 131a of the greasing pipe 130A. Specifically, while paying close attention to the screen (an image including the tip end portion of the greasing pipe 130A and its surrounding environments (for example, the corresponding portion C on the front side)) displayed on the display portion 163 attached to the operation portion 162 grasped by one hand (for example, the right hand), the operator grasps the greasing vessel 150 with the other hand (for example, the left hand) and operates (for example, pushes the push rod 152 illustrated in FIG. 16 in the axial direction thereof) it to supply grease from the injection port 131a of the greasing pipe 130A to the corresponding portion C (see FIG. 22) on the front side.

Next, when the supply of grease to the corresponding portion C on the front side is completed, as the fourth step, the operator removes the greasing pipe 130A from the through hole 31 of the clutch housing 30.

Next, as a fifth step, to prevent (and to secure the field of view of the endoscope 160A) the insertion portion 180 (greasing pipe 130A and endoscope 160A) inserted into the corresponding portion C on the back side from interfering with obstacles inside the clutch housing 30, the operator arranges the endoscope 160A at an appropriate angle position with respect to the greasing pipe 130A according to the layout of the internal structure of the clutch housing 30.

Figure 24:
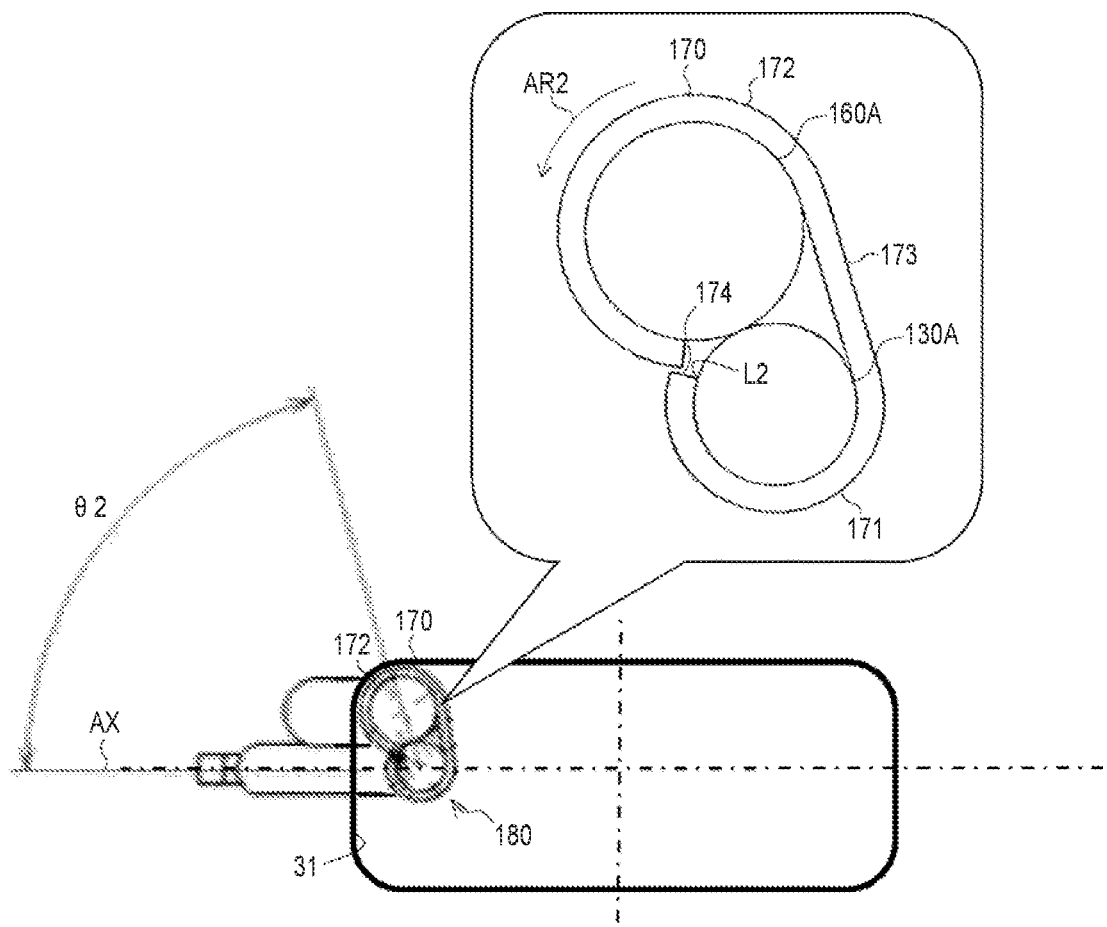
FIG. 24 is a view illustrating a state in which the insertion portion is inserted into the through hole of the clutch housing in order to supply grease to a corresponding portion on a back side.

This is realized by rotating (see the arrow AR2 in FIG. 24) the holding member 170 in a state of holding the greasing pipe 130A and the endoscope 160A with respect to the greasing pipe 130A, and matching (see FIG. 24) the winding finish end portion 174 on the injection-portion insertion portion 171 side of the holding member 170 with the second marking line L2 (see FIG. 19) attached to the outer peripheral surface of the greasing pipe 130A. FIG. 24 is a view illustrating a state in which the insertion portion 180 is inserted into the through hole 31 of the clutch housing 30 in order to supply grease to the corresponding portion C on the back side. FIG. 24 is a view of the through hole 31 seen from the direction opposite to the arrow AR4 in FIG. 22.

The second marking line L2 is provided at a position where the winding finish end portion 174 on the injection-portion insertion portion 171 side of the holding member 170 matches the second marking line L2 when the endoscope 160A is arranged at a position of an angle θ2 (see FIG. 24) with respect to the greasing pipe 130A (reference line AX). In the case of FIG. 24, the angle θ2 is, for example, 75°.

Therefore, by visually confirming the positional relationship between the winding finish end portion 174 on the injection-portion insertion portion 171 side of the holding member 170 and the second marking line L2, the operator can grasp that the endoscope 160A is arranged at the position of the angle θ2 (see FIG. 24) with respect to the greasing pipe 130A (reference line AX).

Next, as a sixth step, the operator inserts the insertion portion 180 in which the endoscope 160A is arranged at the position of the angle θ2 through the through hole 31 of the clutch housing 30. In this case, as illustrated in FIG. 24, the insertion portion 180 is inserted while causing the imaging-unit insertion portion 172 of the holding member 170 to be in contact with a corner portion (left corner portion in FIG. 24) corresponding to the corresponding portion C on the back side of the through hole 31 of the clutch housing 30, that is, while guiding the insertion direction of the insertion portion 180 into the corresponding portion C on the back side. As described above, in the fifth embodiment, the guide function is realized by the corner portion of the through hole 31 of the clutch housing 30 and the imaging-unit insertion portion 172 of the holding member 170.

Figure 25:
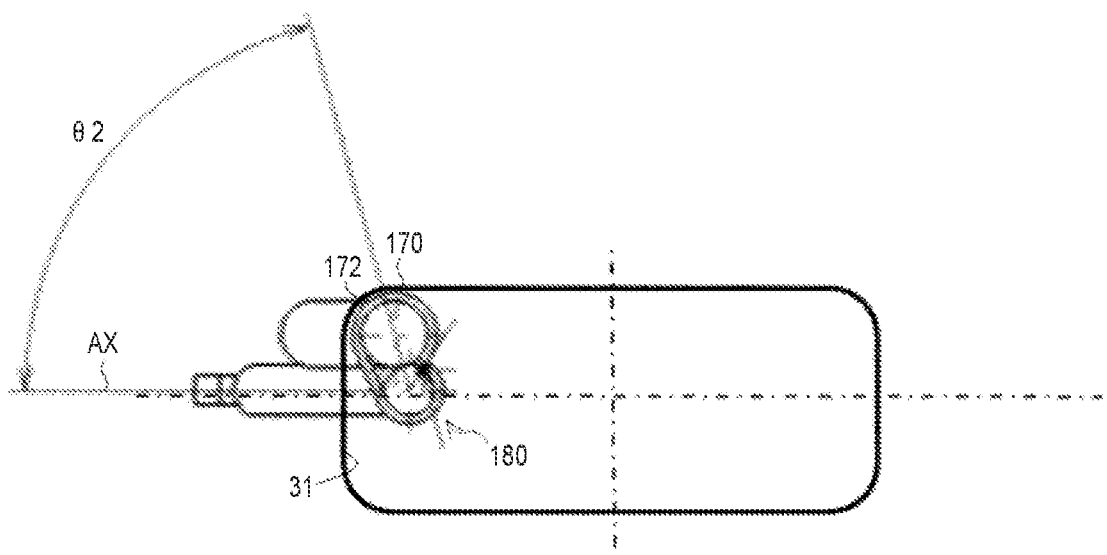
FIG. 25 is a view (modification example) illustrating a state in which the insertion portion is inserted into the through hole of the clutch housing in order to supply grease to the corresponding portion on the back side.

The guide function may be realized as follows. FIG. 25 is a view (modification example) illustrating a state in which the insertion portion 180 is inserted into the through hole 31 of the clutch housing 30 in order to supply grease to the corresponding portion C on the back side. That is, as illustrated in FIG. 25, the insertion portion 180 may be inserted while causing the imaging-unit insertion portion 172 of the holding member 170, which is the right-left inverted holding member 170 illustrated in FIG. 20, to be in contact with the corner portion (left corner portion in FIG. 25) corresponding to the corresponding portion C on the back side of the through hole 31 of the clutch housing 30. This is realized by executing, between the fourth step and the fifth step, a process of removing the greasing pipe 130A and the endoscope 160A from the holding member 170, inverting the holding member 170 right and left, and holding the greasing pipe 130A and the endoscope 160A again with the holding member 170 inverted right and left.

Figure 26:
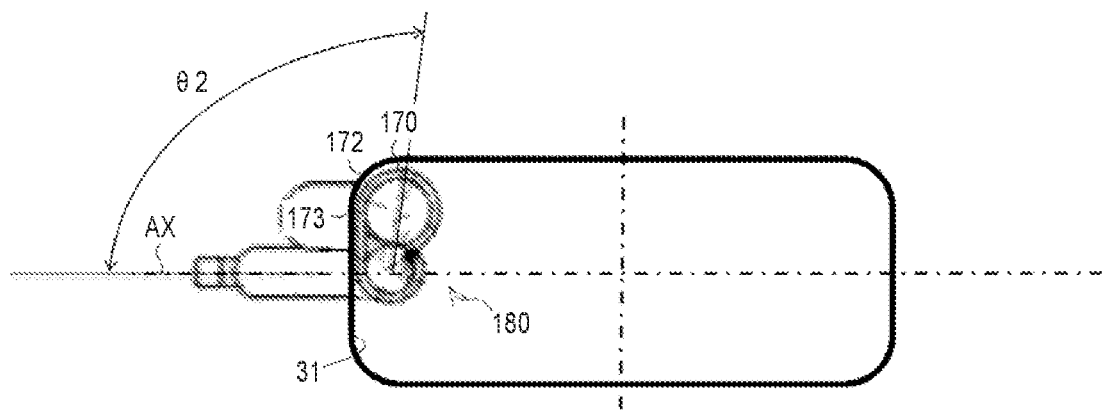
FIG. 26 is a view (modification example) illustrating a state in which the insertion portion is inserted into the through hole of the clutch housing in order to supply grease to the corresponding portion on the back side.

Further, the guide function may be realized as follows. FIG. 26 is a view (modification example) illustrating a state in which the insertion portion 180 is inserted into the through hole 31 of the clutch housing 30 in order to supply grease to the corresponding portion C on the back side. That is, as illustrated in FIG. 26, the insertion portion 180 may be inserted while not only the imaging-unit insertion portion 172 of the holding member 170, but also the flat portion 173 is in contact with the corner portion (left corner portion in FIG. 26) corresponding to the corresponding portion C on the back side of the through hole 31 of the clutch housing 30. This is an example of realizing the guide function by the corner portion of the through hole 31 of the clutch housing 30, the imaging-unit insertion portion 172 and the flat portion 173 of the holding member 170. In the case of FIG. 26, the angle θ2 is, for example, 100°.

In the following steps, while paying close attention to the screen (an image including the tip end portion of the greasing pipe 130A and its surrounding environments (for example, the corresponding portion C on the back side)) displayed on the display portion 163 attached to the operation portion 162 gripped with one hand (for example, the right hand), the operator inserts the insertion portion 180 gripped by the other hand (for example, the left hand) into the corresponding portion C on the back side, such that the tip end portion 131 of the greasing pipe 130A reaches the corresponding portion C on the back side.

Along with the operation of inserting the insertion portion 180 into the corresponding portion C on the back side, the tip end portion 131 of the greasing pipe 130A eventually reaches the position P4 (see FIG. 22) that is the predetermined distance from the corresponding portion C on the back side, and then it reaches the position P3 (see FIG. 22) near the corresponding portion C on the back side.

Next, when the fourth marking line L4 matches the through hole 31 of the clutch housing 30, that is, when the tip end portion 131 of the greasing pipe 130A reaches the position P3 (see FIG. 22) near the corresponding portion C on the back side, as a seventh step, the operator inserts the tip end portion 131 of the greasing pipe 130A between the clutch release fork 21 (pressing portion 21a) and the release bearing 15, and supplies grease to the corresponding portion C on the back side from the injection port 131a of the greasing pipe 130A. Specifically, while paying close attention to the screen (an image including the tip end portion of the greasing pipe 130A and its surrounding environments (for example, the corresponding portion C on the back side)) displayed on the display portion 163 attached to the operation portion 162 grasped by one hand (for example, the right hand), the operator grasps the greasing vessel 150 with the other hand (for example, the left hand) and operates (for example, pushes the push rod 152 illustrated in FIG. 16 in the axial direction thereof) it to supply grease from the injection port 131a of the greasing pipe 130A to the corresponding portion C on the back side.

Next, when the supply of grease to the corresponding portion C on the back side is completed, as an eighth step, the operator removes the greasing pipe 130A from the through hole 31 of the clutch housing 30.

By executing each of the above steps, greasing on the corresponding portion C on the front side and the corresponding portion C on the back side is completed.

As described above, according to the fifth embodiment, the insertion portion 180 can be inserted into the corresponding portion C without using a guide jig.

This is due to the fact that the guide function is realized by the through hole 31 (corner portion, or the like) of the clutch housing 30 and the holding member 170 (imaging-unit insertion portion 172, flat portion 173).

Further, according to the fifth embodiment, the endoscope 160A can be arranged at an appropriate angle position with respect to the greasing pipe 130A.

This is due to the provision of the holding member 170 that holds the greasing pipe 130A and the endoscope 160A in parallel and in an adjacently arranged manner and the provision of the greasing pipe 130A with the marking (for example, the marking lines L1 and L2) on the injection portion side that matches the marking (for example, the winding finish end portion 174 on the injection-portion insertion portion 171 side of the holding member 170) on the holding member side of the holding member 170.

Further, according to the fifth embodiment, it is possible to perform greasing on the pressing portion 21a of the clutch release fork 21 without removing the clutch housing 30 (or a manual transmission unit including the clutch housing 30) from the vehicle. This facilitates the greasing maintenance work and improves workability.

Next, a first modification example of the holding member 170 of the fifth embodiment will be described.

Figure 27:
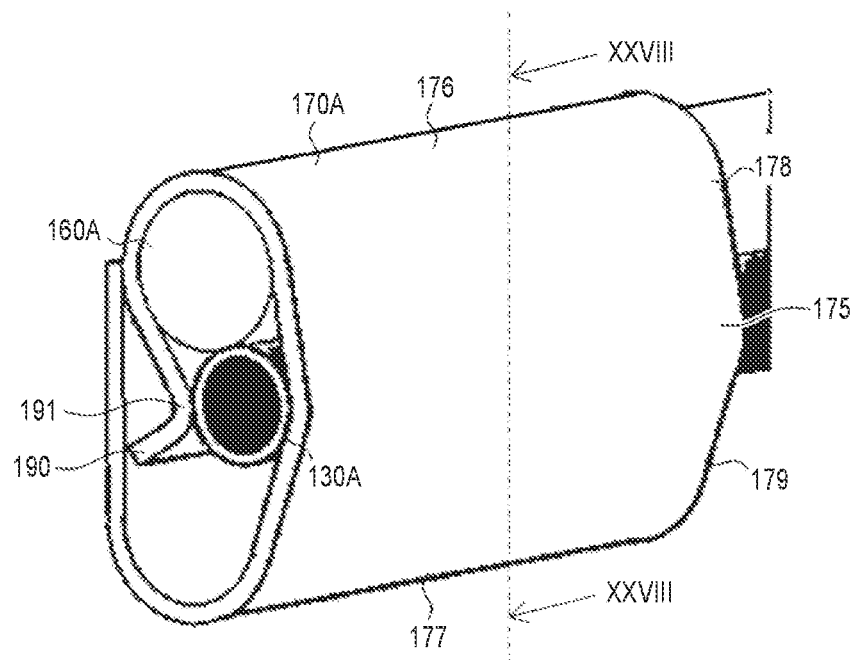
FIG. 27 is a perspective view of a holding member which is a first modification example.
Figure 28:
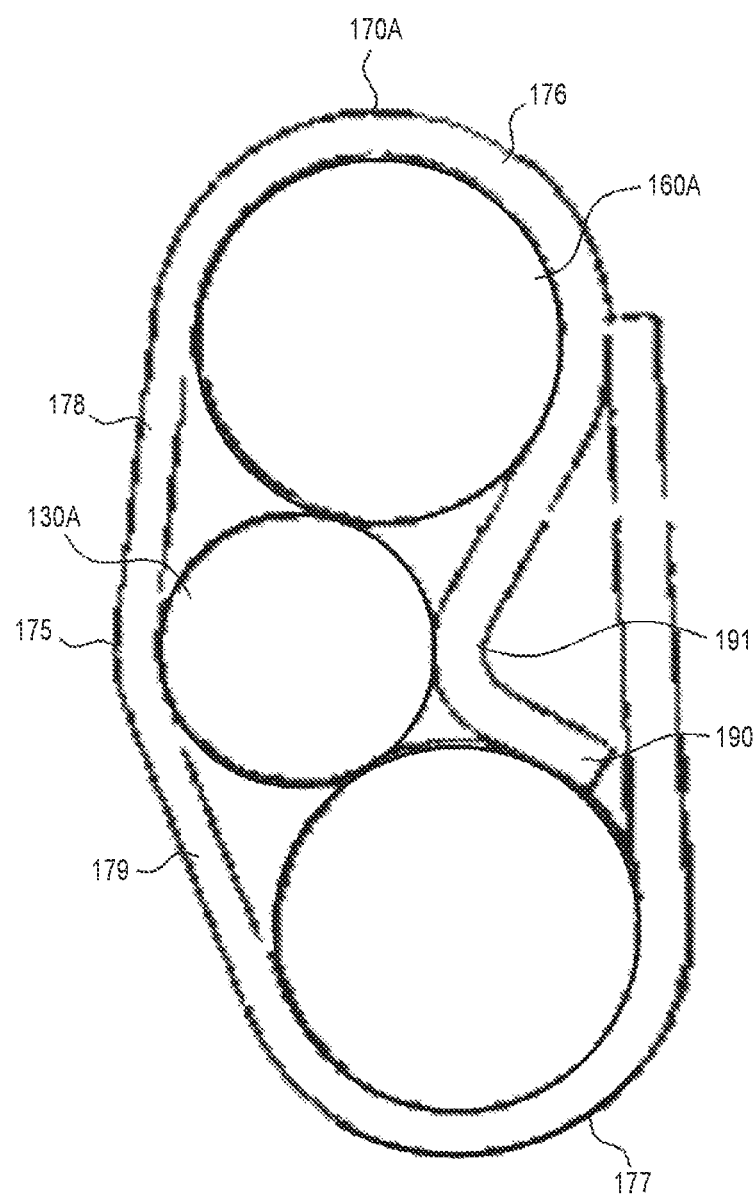
FIG. 28 is a cross-sectional view taken along the line XXVIII-XXVIII of FIG. 27.

FIG. 27 is a perspective view of a holding member 170A, which is the first modification example, and FIG. 28 is a cross-sectional view taken along the line XXVIII-XXVIII of FIG. 27.

As illustrated in FIGS. 27 and 28, the holding member 170A includes a third semi-cylindrical portion 175, which is an injection-portion insertion portion into which the greasing pipe 130A (cylindrical portion on the base end portion side) is press-fitted, a fourth semi-cylindrical portion 176 and a fifth semi-cylindrical portion 177, each of which is an imaging-unit insertion portion into which the endoscope 160A (cylindrical portion on the base end portion side) is press-fitted, a second connection portion 178 which connects the third semi-cylindrical portion 175 and the fourth semi-cylindrical portion 176, and a third connection portion 179 which connects the third semi-cylindrical portion 175 and the fifth semi-cylindrical portion 177.

The second connection portion 178 is a flat portion connecting a first end portion of the third semi-cylindrical portion 175 and a first end portion of the fourth semi-cylindrical portion 176. This flat portion (second connection portion 178) extends tangentially to the third semi-cylindrical portion 175 and the fourth semi-cylindrical portion 176 (see FIG. 28).

The third connection portion 179 is a flat portion connecting a second end portion of the third semi-cylindrical portion 175 and a first end portion of the fifth semi-cylindrical portion 177. This flat portion (third connection portion 179) extends tangentially to the third semi-cylindrical portion 175 and the fifth semi-cylindrical portion 177 (see FIG. 28).

The fourth semi-cylindrical portion 176 is formed in a state where a first end portion of the plate is folded back into a semi-cylindrical shape. Similarly, the fifth semi-cylindrical portion 177 is formed with a second end portion of the plate folded back into a semi-cylindrical shape.

The third semi-cylindrical portion 175 is formed in a plate portion between the fourth semi-cylindrical portion 176 and the fifth semi-cylindrical portion 177.

The second connection portion 178 is a plate portion between the third semi-cylindrical portion 175 and the fourth semi-cylindrical portion 176. The third connection portion 179 is a plate portion between the third semi-cylindrical portion 175 and the fifth semi-cylindrical portion 177.

One end portion (free end portion) of the plate includes a first biasing portion 190, which biases the endoscope 160A (cylindrical portion on the base end portion side) inserted into the fourth semi-cylindrical portion 176 with respect to the fourth semi-cylindrical portion 176, and a second biasing portion 191, which biases the greasing pipe 130A (cylindrical portion on the base end portion side) inserted into the third semi-cylindrical portion 175 with respect to the third semi-cylindrical portion 175.

The third semi-cylindrical portion 175 is fixed to the greasing pipe 130A (cylindrical portion on the base end portion side) inserted into the third semi-cylindrical portion 175. This fixing can be performed by any known means such as an adhesive or welding.

The holding member 170A (plate) is made of synthetic resin or spring steel. That is, the holding member 170A may be formed by performing injection-molding with a synthetic resin, or may be formed by bending or pressing a plate-shaped spring steel.

As described above, according to the first modification example, by press-fitting the endoscope 160A (cylindrical portion on the base end portion side) into the fourth semi-cylindrical portion 176 or the fifth semi-cylindrical portion 177, depending on the layout of the internal structure of the clutch housing 30, the operator can position the endoscope 160A at an appropriate angle position with respect to the greasing pipe 130A. As a result, when inserting the insertion portion 180 (greasing pipe 130A and endoscope 160A) into the corresponding portion C, it is possible to prevent the insertion portion 180 (greasing pipe 130A and endoscope 160A) from interfering with obstacles inside the clutch housing 30.

Further, according to the first modification example, the second connection portion 178 and the third connection portion 179 are flat portions. Thus, compared with a second modification example described below, in which a fourth connection portion 178B and a fifth connection portion 179B respectively corresponding to the second connection portion 178 and the third connection portion 179 are curved portions, the manufacturing cost (processing cost for bending the second connection portion 178 and the third connection portion 179, or the like) of the holding member 170A can be suppressed.

Further, according to the first modification example, by executing the same steps as the first to eighth steps described in the fifth embodiment, the same effect as that of the fifth embodiment can be obtained.

Next, the second modification example of the fifth embodiment will be described.

Figure 29:
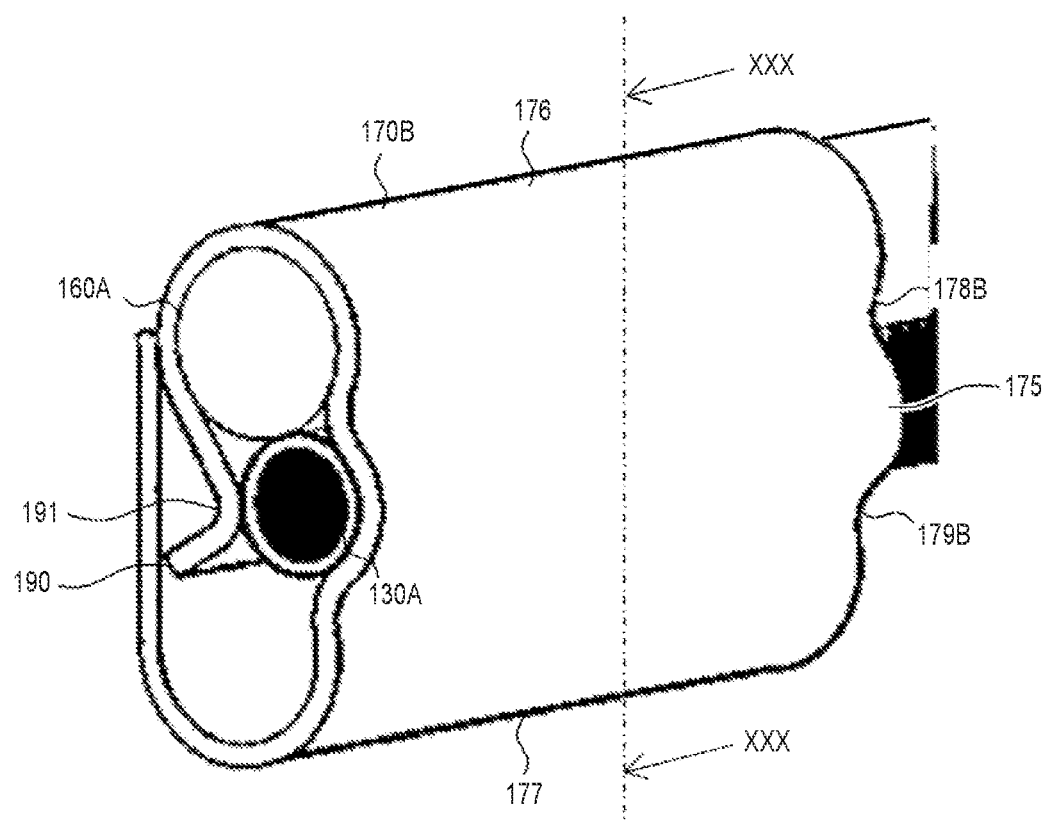
FIG. 29 is a perspective view of a holding member which is a second modification example.
Figure 30:
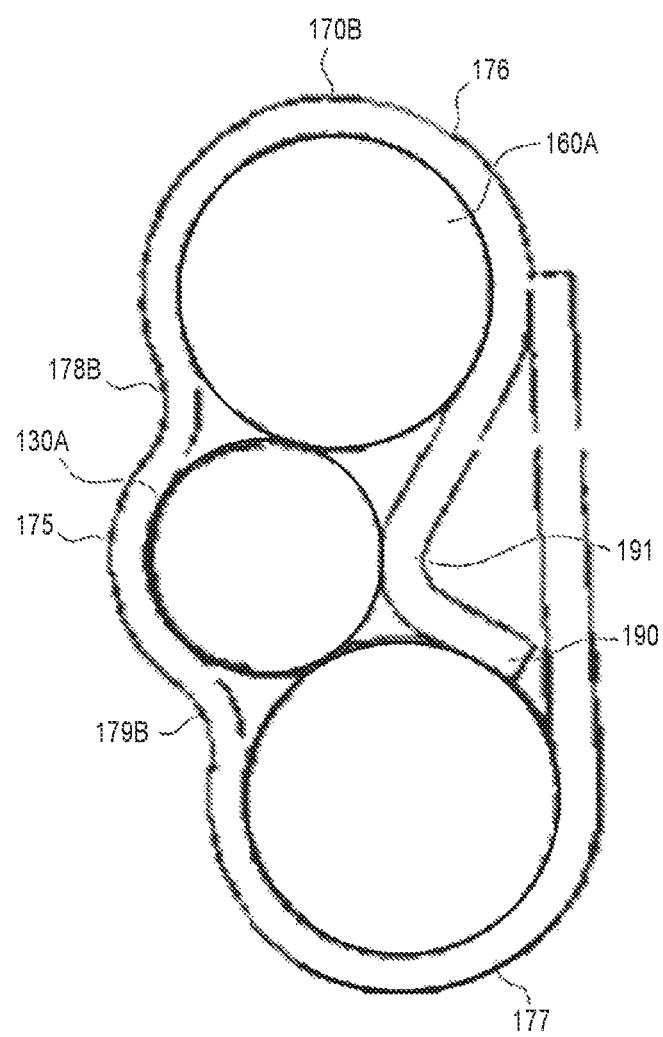
FIG. 30 is a cross-sectional view taken along the line XXX-XXX of FIG. 29.

FIG. 29 is a perspective view of a holding member 170B, which is the second modification example, and FIG. 30 is a cross-sectional view taken along the line CC of FIG. 29.

The holding member 170B corresponds to a holding member in which the second connection portion 178, which is the flat portion of the holding member 170A as the first modification example, is replaced with the fourth connection portion 178B which is the curved portion, and the third connection portion 179, which is the flat portion of the holding member 170A as the first modification example, is replaced with the fifth connection portion 179B which is the curved portion. Further, the third semi-cylindrical portion 175 is not fixed to the greasing pipe 130A (cylindrical portion on the base end portion side) inserted into the third semi-cylindrical portion 175. Other than that, it is the same as the holding member 170A which is the first modification example. Hereinafter, the differences from the holding member 170A, which is the first modification example, will be mainly described, and the same reference numerals will be given to the same configurations and the description thereof will be omitted as appropriate.

As illustrated in FIGS. 29 and 30, the holding member 170B includes the third semi-cylindrical portion 175, which is an injection-portion insertion portion into which the greasing pipe 130A (cylindrical portion on the base end portion side) is press-fitted, the fourth semi-cylindrical portion 176 and the fifth semi-cylindrical portion 177, each of which is an imaging-unit insertion portion into which the endoscope 160A (cylindrical portion on the base end portion side) is press-fitted, the fourth connection portion 178B which connects the third semi-cylindrical portion 175 and the fourth semi-cylindrical portion 176, and the fifth connection portion 179B which connects the third semi-cylindrical portion 175 and the fifth semi-cylindrical portion 177.

The fourth connection portion 178B is the curved portion that connects a first end portion of the third semi-cylindrical portion 175 and a first end portion of the fourth semi-cylindrical portion 176.

The fifth connection portion 179B is the curved portion that connects a second end portion of the third semi-cylindrical portion 175 and a first end portion of the fifth semi-cylindrical portion 177.

The fourth connection portion 178B is a plate portion between the third semi-cylindrical portion 175 and the fourth semi-cylindrical portion 176. The fifth connection portion 179B is a plate portion between the third semi-cylindrical portion 175 and the fifth semi-cylindrical portion 177.

The holding member 170B (plate) is made of synthetic resin or spring steel. That is, the holding member 170B may be formed by performing injection-molding with a synthetic resin, or may be formed by bending or pressing a plate-shaped spring steel.

As described above, according to the second modification example, by press-fitting the endoscope 160A (cylindrical portion on the base end portion side) into the fourth semi-cylindrical portion 176 or the fifth semi-cylindrical portion 177, depending on the layout of the internal structure of the clutch housing 30, the operator can position the endoscope 160A at an appropriate angle position with respect to the greasing pipe 130A. As a result, when inserting the insertion portion 180 (greasing pipe 130A and endoscope 160A) into the corresponding portion C, it is possible to prevent the insertion portion 180 (greasing pipe 130A and endoscope 160A) from interfering with obstacles inside the clutch housing 30.

Further, according to the second modification example, by executing the same steps as the first to eighth steps described in the fifth embodiment, the same effect as that of the fifth embodiment can be obtained.

In the fifth embodiment described above, the example in which grease is used as a fluid substance is described, but the applicable embodiment is not limited to this. For example, a fluid may be used as the fluid substance. In this case, the corresponding portion C is the portion where the fluid needs to be supplied. Further, as the fluid substance, a fluid substance other than grease and fluid may be used.

Further, in the fifth embodiment, the example in which the injection device and the insertion direction guide method of the present disclosure are applied to the field of vehicles (grease injection maintenance of the clutch release mechanism) is described, but the applicable embodiment is not limited to this. For example, the injection device and the insertion direction guide method of the present disclosure may be applied to various fields other than vehicles, such as medicine and semiconductors. For example, in the fifth embodiment described above, the example in which the partition wall between the operator and the corresponding portion is clutch housing 30 is described, but the applicable embodiment is not limited to this. That is, the partition wall between the operator and the corresponding portion may be a partition wall according to the field to which the injection device and the insertion direction guide method of the present disclosure are applied. Further, in the fifth embodiment, the example of inserting the insertion portion 180 into the corresponding portion C while (that is, while guiding the insertion direction of the insertion portion 180 into the corresponding portion C) causing the insertion portion 180 to be in contact with the corner portion of the opening portion (for example, the through hole 31) formed in the partition wall (for example, the clutch housing 30) between the operator and the corresponding portion is described, but the applicable embodiment is not limited to this. For example, when a notch portion (not illustrated) is formed in the partition wall between the operator and the corresponding portion, the insertion portion 180 may be inserted into the corresponding portion C while causing the insertion portion 180 to be in contact with the corner portion of the notch portion (that is, while guiding the insertion direction of the insertion portion 180 into the corresponding portion).

Sixth Embodiment

Next, as a sixth embodiment, a configuration example for removing foreign matter adhering to the corresponding portion C will be described. This configuration example can be applied to the first to fifth embodiments. Further, this configuration example can be applied not only to the case of removing the foreign matter adhering to the corresponding portion C but also to the case of removing the foreign matter adhering to the vicinity of the corresponding portion C or the like.

Figure 31:
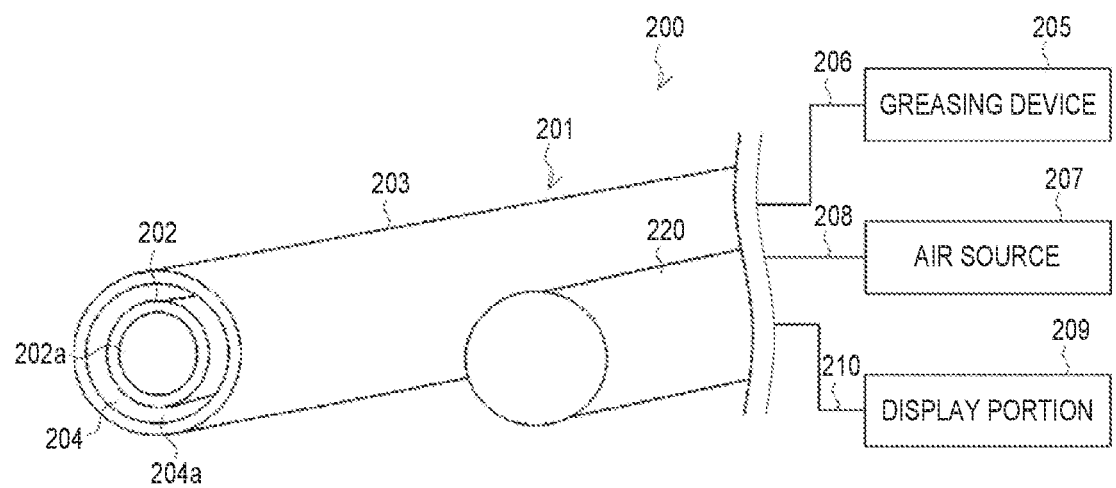
FIG. 31 is a perspective view of a configuration example for removing foreign matter adhering to the corresponding portion.
Figure 32:
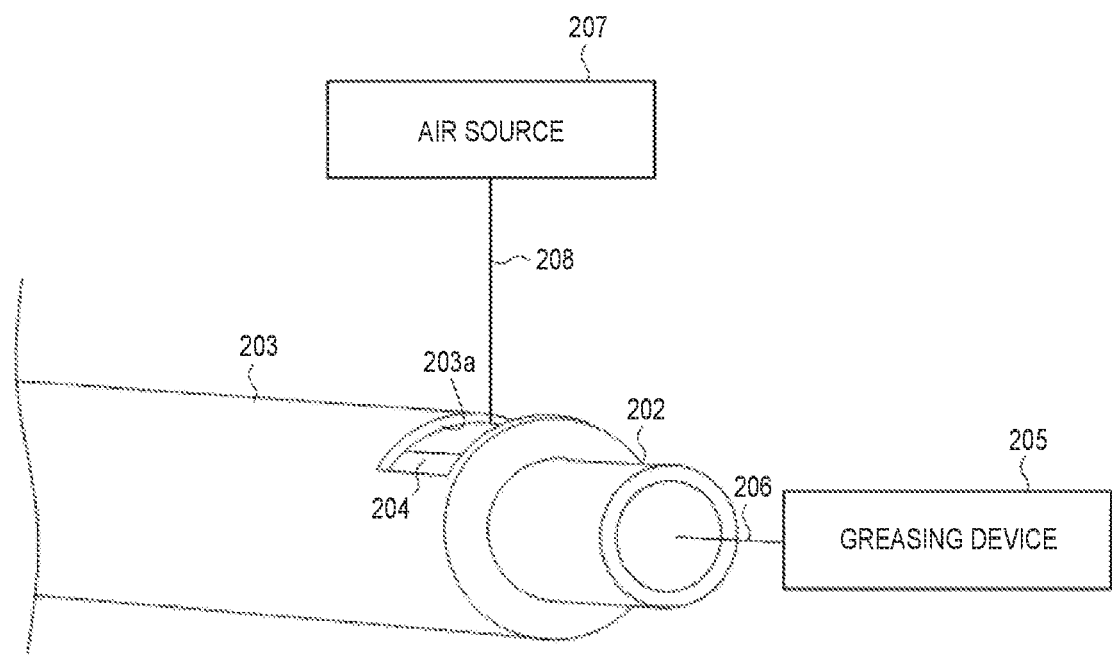
FIG. 32 is a perspective view of a configuration example for removing foreign matter adhering to the corresponding portion.

FIGS. 31 and 32 are perspective views of the configuration example for removing the foreign matter adhering to the corresponding portion C.

As illustrated in FIG. 31, the configuration example for removing the foreign matter adhering to the corresponding portion C includes an insertion portion 200 that is inserted into the corresponding portion C in a narrow space while being gripped by an operator.

The insertion portion 200 includes an injection portion 201. The injection portion 201 is a double pipe line including an inner pipe line 202 and an outer pipe line 203. The inner pipe line 202 is a pipe line provided, at the tip end portion thereof, with a first fluid substance injection port 202a from which grease (an example of the first fluid substance and the fluid substance for application, of the present disclosure) supplied into the inner pipe line 202 is injected. For example, the inner pipe line 202 is the greasing pipe 130 of the first to fourth embodiments and the greasing pipe 130A of the fifth embodiment. A greasing device 205 is connected to the inner pipe line 202 via a flexible pipe 206. The greasing device 205 is, for example, the greasing vessel 150 of the first to fifth embodiments. The grease supplied from the greasing device 205 via the flexible pipe 206 is supplied to the first fluid substance injection port 202a via the inner pipe line 202 and is injected from the first fluid substance injection port 202a. The grease injected from the first fluid substance injection port 202a is supplied (applied) to the corresponding portion C.

The outer pipe line 203 is a pipe line that forms an annular pipe line 204 between the outer pipe line 203 (inner peripheral surface) and the inner pipe line 202 (outer peripheral surface). That is, by providing the outer pipe line 203, the space around the inner pipe line 202 is defined as the annular pipe line 204. As a result, space saving can be realized as compared with the case of FIG. 34 described below. The annular pipe line 204 can be formed, for example, by providing a spacer (not illustrated) between the inner pipe line 202 (outer peripheral surface) and the outer pipe line 203 (inner peripheral surface). The spacer may be, for example, a convex portion(s) formed by plastically deforming a part of the outer pipe line 203 (inner peripheral surface), or other spacers.

The inner pipe line 202 and the outer pipe line 203 may be a round pipe, a rectangular pipe, or a pipe having another shape.

The annular pipe line 204 is a pipe line provided, at the tip end portion thereof, with a second fluid substance injection port 204a from which the air (an example of a second fluid substance and a fluid substance for removing foreign matter, of the present disclosure) supplied into the annular pipe line 204 is injected (blown). An air source 207 is connected to the annular pipe line 204. For example, as illustrated in FIG. 32, the air source 207 is connected via a flexible pipe 208 connected to a through hole 203a which is formed on the base end portion side of the outer pipe line 203 and communicates with the annular pipe line 204. The air source 207 is, for example, an electric air pump capable of switching between supply and stop of air by an operator's operation. The air supplied from the air source 207 via the flexible pipe 208 is supplied to the second fluid substance injection port 204a via the annular pipe line 204 and is injected (blown) from the second fluid substance injection port 204a. The air injected from the second fluid substance injection port 204a is blown toward the corresponding portion C. As a result, foreign matter (for example, mud, dust, powder) adhering to the corresponding portion C is removed (cleaned).

Further, the insertion portion 200 includes an imaging unit 220. The imaging unit 220 is, for example, the endoscope 160 of the first to fourth embodiments and the endoscope 160A of the fifth embodiment. From the viewpoint of preventing grease adhesion and the like, the imaging unit 220 may be arranged at a position separated from the tip end portion (first fluid substance injection port 202a, second fluid substance injection port 204a) of the injection portion 201 by a certain distance.

Next, a method for removing the foreign matter adhering to the corresponding portion C will be described.

First, as a first step, an operator inserts the insertion portion 200 through the through hole 31 of the clutch housing 30.

Each of the following steps is executed while paying close attention to the screen (an image including the tip end portion of the inner pipe line 202, the tip end portion of the annular pipe line 204, and their surrounding environments (for example, foreign matter adhering to the corresponding portion C)) displayed on the display portion 163 attached to the operation portion 162 held by the operator with one hand (for example, the right hand).

Next, as a second step, the operator inserts the insertion portion 200 gripped by the other hand (for example, the left hand) into the corresponding portion C until the second fluid substance injection port 204*a* reaches the vicinity of the corresponding portion C to which the foreign matter is attached.

Next, as a third step, the operator operates the air source 207 to inject (blow) air from the second fluid substance injection port 204*a* and blow the air toward the corresponding portion C. By executing each of the steps described above, the foreign matter adhering to the corresponding portion C can be removed (cleaned) from the corresponding portion C. Further, in the second step, while injecting (blowing) air from the second fluid substance injection port 204*a*, the insertion portion 200 may be inserted into the corresponding portion C, and at the step of supplying (applying) grease to the corresponding portion C, the air source 207 may be operated to stop the injection (blowing) of air from the second fluid substance injection port 204*a*.

As described above, according to the sixth embodiment, by blowing the air injected (blown) from the second fluid substance injection port 204*a* toward the corresponding portion C, the foreign matter adhering to the corresponding portion C in the narrow space can be removed (cleaned).

Next, a modification example will be described.

Figure 33:
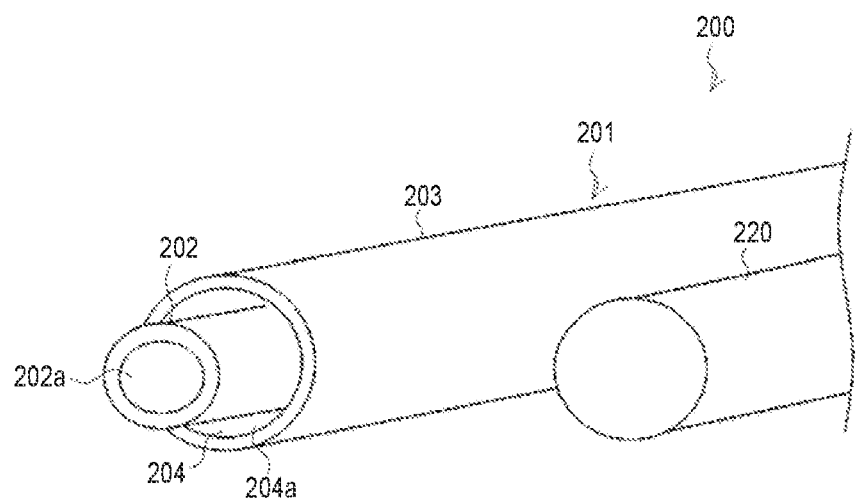
FIG. 33 is a perspective view of a configuration example (modification example 1) for removing foreign matter adhering to the corresponding portion.

FIG. 33 is a perspective view of a configuration example (modification example 1) for removing foreign matter adhering to the corresponding portion C.

As illustrated in FIG. 33, the tip end portion of the inner pipe line 202 may protrude farther than the tip end portion of the outer pipe line 203. In this way, it is possible to prevent the second fluid substance injection port 204*a* from being clogged with grease.

Figure 34:
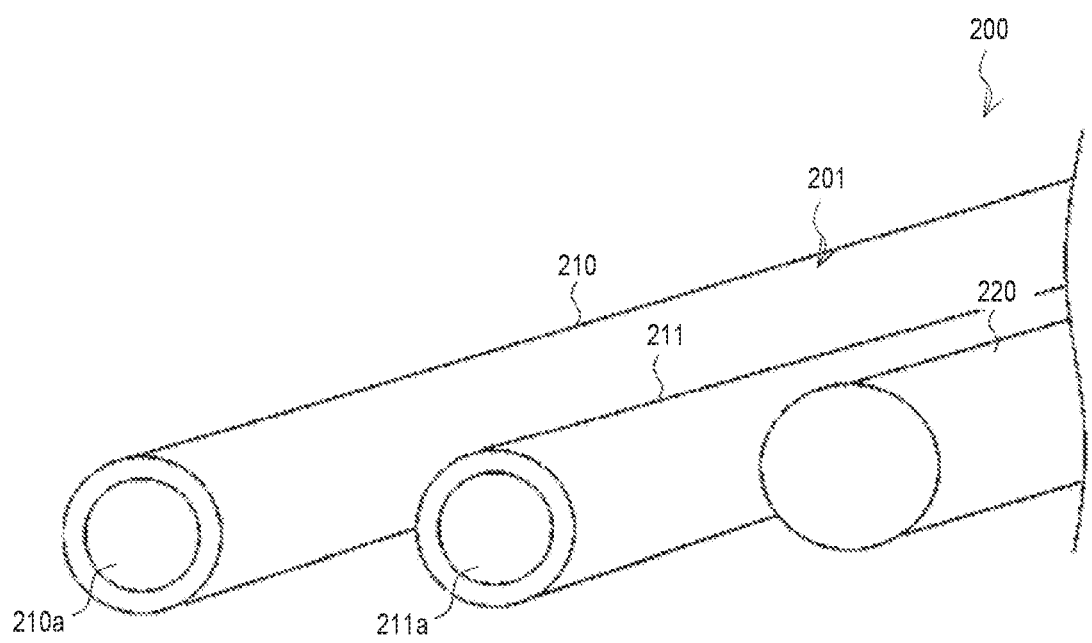
FIG. 34 is a perspective view of a configuration example (modification example 2) for removing foreign matter adhering to the corresponding portion.

FIG. 34 is a perspective view of a configuration example (modification example 2) for removing foreign matter adhering to the corresponding portion C.

In the sixth embodiment, an example in which the injection portion which is a double pipe line including the inner pipe line 202 and the outer pipe line 203 is used as the injection portion 201 is described, but the applicable embodiment is not limited to this.

For example, as illustrated in FIG. 34, as the injection portion 201, an injection portion including a first pipe line 210 and a second pipe line 211 arranged in parallel with each other may be used.

The first pipe line 210 is a pipe line provided, at the tip end portion thereof, with a first fluid substance injection port 210*a* from which the grease supplied into the first pipe line 210 is injected. The second pipe line 211 is a pipe line provided, at the tip end portion thereof, with a second fluid substance injection port 211*a* from which the air supplied into the second pipe line 211 is injected (blown).

The same effect as that of the sixth embodiment can be obtained by this modification example.

In the sixth embodiment, an example in which grease is used as the first fluid substance is described, but the applicable embodiment is not limited to this. For example, a fluid may be used as the first fluid substance. In this case, the corresponding portion C is a portion where the fluid needs to be supplied. Further, as the first fluid substance, a fluid substance other than grease and fluid, for example, solder (for example, molten solder) may be used. In this case, the corresponding portion C is a portion where the solder needs to be supplied.

Further, in the sixth embodiment, an example in which a gas such as air (for example, air at room temperature) is used as the second fluid substance is described, but the applicable embodiment is not limited to this. A liquid such as a cleaning liquid may be used as the second fluid substance. Further, for example, when the corresponding portion C is dried, air having a high temperature (warm air) may be used as the second fluid substance. Further, when cooling the corresponding portion C, air having a low temperature (cold air) may be used as the second fluid substance.

Further, in the sixth embodiment, the example in which the injection device of the present disclosure is applied to the vehicle field (grease injection maintenance of the clutch release mechanism) is described, but the applicable embodiment is not limited to this. The injection device of the present disclosure may be applied to various fields other than vehicles, such as medicine and semiconductors.

Further, in the sixth embodiment, the example in which the insertion portion 200 includes the imaging unit 220 is described, but the applicable embodiment is not limited to this. For example, the imaging unit 220 may be omitted.

All the numerical values illustrated in the above embodiments are examples, and it goes without saying that appropriate numerical values different from these can be used.

Each of the above embodiments are merely examples in every respect. The applicable embodiment is not limitedly construed by the description of the above embodiments. The present disclosure can be practiced in various other forms without departing from its spirit or key features.

What is claimed is:

1. An injection device comprising:
    an insertion portion configured to be inserted into a corresponding portion in a narrow space in a state of being visually grasped by an operator, wherein:
    the insertion portion includes an injection portion which is a double pipe line including an inner pipe line and an outer pipe line defining an annular pipe line between the inner pipe line and the outer pipe line;
    the inner pipe line is a pipe line provided, at a tip end portion, with a first fluid substance injection port configured to inject a first fluid substance supplied into the inner pipe line;
    the annular pipe line is a pipe line provided, at a tip end portion, with a second fluid substance injection port configured to inject a second fluid substance supplied into the annular pipe line; and
    the insertion portion further includes an imaging unit configured to capture images including the tip end portion of the inner pipe line, the tip end portion of the annular pipe line, and their surrounding environments.

2. The injection device according to claim 1, wherein a tip end of the inner pipe line protrudes farther than a tip end of the outer pipe line.

3. The injection device according to claim 1, wherein:
    the first fluid substance is a fluid substance supplied to the corresponding portion; and
    the second fluid substance is a foreign matter removing fluid substance that removes foreign matter adhering to the corresponding portion.

4. The injection device according to claim 3, wherein:
    the fluid substance is an application fluid substance that is applied to the corresponding portion; and
    the foreign matter removing fluid substance is air.

5. A method for supplying a fluid to the corresponding portion in a narrow space using an injection device according to claim 1, comprising the step of:
    inserting the insertion portion toward the corresponding portion in the narrow space;
    allowing a tip end portion of the injection portion to reach the corresponding portion;
    ejecting the second fluid ejected from the second fluid ejection port provided at the tip end portion of the annular pipe line toward the corresponding portion while displaying the image captured by the image capturing unit; and supplying the first fluid ejected from the first fluid ejection port provided at the tip end portion of the inner pipe line to the corresponding portion while displaying the image captured by the imaging unit.

6. The method according to claim 5, wherein,
the first fluid substance is a fluid substance supplied to the corresponding portion; and
the second fluid substance is a foreign matter removing fluid substance that removes foreign matter adhering to the corresponding portion.

7. The method according to claim 6, wherein,
the fluid substance is an application fluid substance that I applied to the corresponding portion; and
the foreign matter removing fluid substance is air.

8. An injection device comprising:
an insertion portion configured to be inserted into a corresponding portion in a narrow space in a state of being visually grasped by an operator, wherein:
the insertion portion includes an injection portion including a first pipe line and a second pipe line arranged in parallel with each other;
the first pipe line is a pipe line provided, at a tip end portion, with a first fluid substance injection port configured to inject a first fluid substance supplied into the first pipe line;
the second pipe line is a pipe line provided, at a tip end portion, with a second fluid substance injection port configured to inject a second fluid substance supplied into the second pipe line; and
the insertion portion further includes an imaging unit configured to capture images including the tip end portion of the first pipe line, the tip end portion of the second pipe line, and their surrounding environments.

9. The injection device according to claim 8, wherein:
the first fluid substance is a fluid substance supplied to the corresponding portion; and
the second fluid substance is a foreign matter removing fluid substance that removes foreign matter adhering to the corresponding portion.

10. The injection device according to claim 9, wherein:
the fluid substance is an application fluid substance that is applied to the corresponding portion; and
the foreign matter removing fluid substance is air.

11. A method for supplying fluid to the corresponding portion of a narrow space using an injection device as according to claim 8, the method comprising the steps of:
inserting the insertion portion toward the corresponding portion of the narrow space;
allowing a tip of the injection portion to reach the corresponding portion;
ejecting the second fluid ejected from the second fluid ejection port provided at the tip end portion of the second pipe line toward the corresponding portion while displaying the image captured by the imaging unit, and
supplying the first fluid ejected from the first fluid injection port provided at the tip end portion of the first pipe line toward the corresponding portion, while displaying the image captured by the imaging unit.

12. The method according to claim 11, wherein,
the first fluid substance is a fluid substance supplied to the corresponding portion; and
the second fluid substance is a foreign matter removing fluid substance that removes foreign matter adhering to the corresponding portion.

13. The method according to claim 12, wherein,
the fluid substance is an application fluid substance that is applied to the corresponding portion; and
the foreign matter removing fluid substance is air.

\* \* \* \* \*